(12) United States Patent
Ezerzer et al.

(10) Patent No.: US 8,549,107 B2
(45) Date of Patent: Oct. 1, 2013

(54) SYSTEMS AND METHODS FOR HANDLING A PLURALITY OF COMMUNICATIONS FOR DIFFERENT COMPANIES

(75) Inventors: Ran Ezerzer, San Diego, CA (US); Ali Aljane, San Diego, CA (US); Pierre St-Cyr, San Diego, CA (US); Imed Yahmadi, San Diego, CA (US); Eli B. Borodow, San Diego, CA (US); Edwin Kenneth Margulies, Las Vegas, NV (US); Pablo M. Rodriguez, Oak Park, IL (US)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 13/102,970

(22) Filed: May 6, 2011

(65) Prior Publication Data
US 2011/0213860 A1    Sep. 1, 2011

Related U.S. Application Data

(62) Division of application No. 10/233,152, filed on Aug. 28, 2002, now Pat. No. 7,962,644.

(60) Provisional application No. 60/379,955, filed on May 10, 2002, provisional application No. 60/365,890, filed on Mar. 18, 2002, provisional application No. 60/405,719, filed on Aug. 23, 2002.

(51) Int. Cl.
*G06F 15/16*    (2006.01)

(52) U.S. Cl.
USPC .......................................................... 709/218

(58) Field of Classification Search
USPC .......................................................... 709/218
See application file for complete search history.

(56) References Cited

U.S. PATENT DOCUMENTS

| | | | |
|---|---|---|---|
| 5,185,780 A | 2/1993 | Leggett |
| 5,479,487 A | 12/1995 | Hammond |
| 5,557,515 A | 9/1996 | Abbruzzese et al. |
| 5,563,937 A | 10/1996 | Bruno et al. |
| 5,590,188 A | 12/1996 | Crockett |
| 5,684,870 A | 11/1997 | Maloney et al. |
| 5,703,943 A | 12/1997 | Otto |

(Continued)

FOREIGN PATENT DOCUMENTS

| EP | 0806858 | 11/1997 |
|---|---|---|
| EP | 0920224 | 6/1999 |

(Continued)

OTHER PUBLICATIONS

ProQuest, JetForm's Universally Deployable Workflow, 3 pages.

(Continued)

*Primary Examiner* — Jason Recek
(74) *Attorney, Agent, or Firm* — Fliesler Meyer LLP

(57) ABSTRACT

A distributed communication center configured to handle a plurality of communications includes a user zone, a web zone, and a network zone. The user zone includes a plurality of remote terminals that enable communication center personnel and end users to remotely interface with the distributed communication center through the web zone. The web zone includes one or more web servers configured and one or more mail servers to interface the remote terminals in the user zone with the network zone. The network zone includes one or more telephony servers and one or more application servers.

19 Claims, 21 Drawing Sheets

(56) References Cited

U.S. PATENT DOCUMENTS

| | | |
|---|---|---|
| 5,706,507 A | 1/1998 | Schloss |
| 5,742,675 A | 4/1998 | Kilander et al. |
| 5,774,660 A | 6/1998 | Brendel et al. |
| 5,774,670 A | 6/1998 | Montulli |
| 5,790,650 A | 8/1998 | Dunn et al. |
| 5,822,306 A | 10/1998 | Catchpole |
| 5,825,869 A | 10/1998 | Brooks et al. |
| 5,825,870 A | 10/1998 | Miloslavsky |
| 5,841,854 A | 11/1998 | Schumacher |
| 5,889,799 A | 3/1999 | Grossman et al. |
| 5,895,471 A | 4/1999 | King et al. |
| 5,903,641 A | 5/1999 | Tonisson |
| 5,914,713 A | 6/1999 | Nario et al. |
| 5,923,745 A | 7/1999 | Hurd |
| 5,940,496 A | 8/1999 | Gisby et al. |
| 5,943,416 A | 8/1999 | Gisby |
| 5,953,406 A | 9/1999 | LaRue et al. |
| 5,960,404 A | 9/1999 | Chaar et al. |
| 5,978,465 A | 11/1999 | Corduroy et al. |
| 5,982,873 A | 11/1999 | Flockhart et al. |
| 6,012,088 A | 1/2000 | Li et al. |
| 6,014,688 A | 1/2000 | Venkatraman et al. |
| 6,029,141 A | 2/2000 | Bezos et al. |
| 6,044,355 A | 3/2000 | Crockett et al. |
| 6,046,762 A | 4/2000 | Sonesh et al. |
| 6,070,242 A | 5/2000 | Wong et al. |
| 6,073,178 A | 6/2000 | Wong et al. |
| 6,134,530 A | 10/2000 | Bunting et al. |
| 6,163,607 A | 12/2000 | Bogart et al. |
| 6,173,053 B1 | 1/2001 | Bogart et al. |
| 6,173,312 B1 | 1/2001 | Atarashi et al. |
| 6,175,564 B1 | 1/2001 | Miloslavsky et al. |
| 6,185,288 B1 | 2/2001 | Wong |
| 6,188,761 B1 | 2/2001 | Dickerman et al. |
| 6,201,804 B1 | 3/2001 | Kikinis |
| 6,225,998 B1 | 5/2001 | Okita et al. |
| 6,226,748 B1 | 5/2001 | Bots et al. |
| 6,229,888 B1 | 5/2001 | Miloslavsky |
| 6,230,197 B1 | 5/2001 | Beck et al. |
| 6,233,332 B1 | 5/2001 | Anderson et al. |
| 6,243,092 B1 | 6/2001 | Okita et al. |
| 6,259,909 B1 | 7/2001 | Ratayczak et al. |
| 6,263,066 B1 | 7/2001 | Shtivelman et al. |
| 6,295,353 B1 | 9/2001 | Flockhart et al. |
| 6,295,551 B1 | 9/2001 | Roberts et al. |
| 6,298,045 B1 | 10/2001 | Pang et al. |
| 6,298,356 B1 | 10/2001 | Jawahar et al. |
| 6,308,188 B1 | 10/2001 | Bernardo et al. |
| 6,363,145 B1 | 3/2002 | Shaffer et al. |
| 6,373,836 B1 | 4/2002 | Deryugin et al. |
| 6,389,400 B1 | 5/2002 | Bushey et al. |
| 6,424,624 B1 | 7/2002 | Galand et al. |
| 6,487,290 B1 | 11/2002 | Le Grand |
| 6,487,291 B1 | 11/2002 | Walker et al. |
| 6,493,447 B1 | 12/2002 | Goss et al. |
| 6,493,695 B1 | 12/2002 | Pickering et al. |
| 6,496,867 B1 | 12/2002 | Beser et al. |
| 6,535,600 B1 | 3/2003 | Fisher et al. |
| 6,553,113 B1 | 4/2003 | Dhir et al. |
| 6,570,980 B1 | 5/2003 | Baruch |
| 6,574,331 B1 | 6/2003 | Forsythe et al. |
| 6,597,685 B2 | 7/2003 | Miloslavsky et al. |
| 6,606,740 B1 | 8/2003 | Lynn et al. |
| 6,618,710 B1 | 9/2003 | Zondervan et al. |
| 6,625,141 B1 | 9/2003 | Glitho et al. |
| 6,628,777 B1 | 9/2003 | McIllwaine et al. |
| 6,661,882 B1 | 12/2003 | Muir et al. |
| 6,665,395 B1 | 12/2003 | Busey et al. |
| 6,674,713 B1 | 1/2004 | Berg et al. |
| 6,674,852 B1 | 1/2004 | Hamilton |
| 6,681,010 B1 | 1/2004 | Anderson et al. |
| 6,697,858 B1 | 2/2004 | Ezerzer et al. |
| 6,704,410 B1 | 3/2004 | McFarlane et al. |
| 6,718,366 B2 | 4/2004 | Beck et al. |
| 6,732,178 B1 | 5/2004 | Van Horne et al. |
| 6,735,299 B2 | 5/2004 | Krimstock et al. |
| 6,744,858 B1 | 6/2004 | Ryan et al. |
| 6,745,235 B2 | 6/2004 | Baca et al. |
| 6,751,310 B1 | 6/2004 | Crossley |
| 6,760,324 B1 | 7/2004 | Scott et al. |
| 6,763,104 B1 | 7/2004 | Judkins et al. |
| 6,771,760 B1 | 8/2004 | Vortman et al. |
| 6,779,020 B1 | 8/2004 | Henrick |
| 6,798,768 B1 | 9/2004 | Gallick et al. |
| 6,798,876 B1 | 9/2004 | Bala |
| 6,801,620 B2 | 10/2004 | Smith et al. |
| 6,865,268 B1 | 3/2005 | Matthews et al. |
| 6,879,685 B1 | 4/2005 | Peterson et al. |
| 6,895,558 B1 | 5/2005 | Loveland |
| 6,904,161 B1 | 6/2005 | Becker et al. |
| 6,910,074 B1 | 6/2005 | Amin et al. |
| 6,912,272 B2 | 6/2005 | Kirk et al. |
| 6,934,379 B2 | 8/2005 | Falcon et al. |
| 6,970,829 B1 | 11/2005 | Leamon |
| 7,039,176 B2 | 5/2006 | Borodow et al. |
| 7,069,536 B2 | 6/2006 | Yaung |
| 7,085,834 B2 | 8/2006 | Delany et al. |
| 7,103,171 B1 | 9/2006 | Annadata et al. |
| 7,155,720 B2 | 12/2006 | Casati et al. |
| 7,228,547 B2 | 6/2007 | Yaung |
| 7,254,641 B2 | 8/2007 | Broughton et al. |
| 7,289,966 B2 | 10/2007 | Ouchi |
| 7,321,298 B2 | 1/2008 | Judkins et al. |
| 7,382,773 B2 | 6/2008 | Schoeneberger et al. |
| 7,454,466 B2 | 11/2008 | Bellotti et al. |
| 7,568,001 B2 | 7/2009 | McPartlan et al. |
| 7,581,011 B2 | 8/2009 | Teng |
| 8,031,860 B2 * | 10/2011 | Coussement ............ 379/265.09 |
| 2001/0011228 A1 | 8/2001 | Shenkman |
| 2001/0024497 A1 | 9/2001 | Campbell et al. |
| 2001/0040887 A1 * | 11/2001 | Shtivelman et al. .......... 370/352 |
| 2002/0001300 A1 | 1/2002 | Miloslavsky et al. |
| 2002/0029161 A1 | 3/2002 | Brodersen et al. |
| 2002/0032706 A1 | 3/2002 | Perla et al. |
| 2002/0065912 A1 * | 5/2002 | Catchpole et al. ............ 709/224 |
| 2002/0067822 A1 | 6/2002 | Cohen et al. |
| 2002/0091832 A1 * | 7/2002 | Low et al. .................... 709/227 |
| 2002/0120459 A1 | 8/2002 | Dick et al. |
| 2003/0018508 A1 | 1/2003 | Schwanke |
| 2003/0028642 A1 * | 2/2003 | Agarwal et al. ............... 709/226 |
| 2003/0069780 A1 | 4/2003 | Hailwood et al. |
| 2003/0101082 A1 | 5/2003 | Volpe et al. |
| 2003/0105757 A1 * | 6/2003 | Mangrola ........................ 707/9 |
| 2003/0163569 A1 * | 8/2003 | Panasyuk et al. ............ 709/227 |
| 2003/0174830 A1 | 9/2003 | Boyer et al. |
| 2003/0200527 A1 | 10/2003 | Lynn et al. |
| 2004/0057569 A1 | 3/2004 | Busey et al. |
| 2005/0021713 A1 | 1/2005 | Dugan et al. |
| 2005/0080705 A1 | 4/2005 | Chaganti |
| 2005/0125487 A1 | 6/2005 | O'Connor et al. |

FOREIGN PATENT DOCUMENTS

| | | |
|---|---|---|
| EP | 1073249 | 1/2001 |
| JP | 11317817 | 11/1999 |
| JP | 2002-007354 | 11/2002 |
| WO | 9853593 | 11/1998 |
| WO | 0150336 | 7/2001 |
| WO | 0209399 | 1/2002 |
| WO | 0215030 | 2/2002 |
| WO | 0227571 | 4/2002 |
| WO | 02065741 | 8/2002 |
| WO | 03061242 | 7/2003 |
| WO | 0007135 | 2/2010 |

OTHER PUBLICATIONS

Telephony@Work, Inc., Callcenter Anywhere, The Complete Contact Center Solution, Administration Manager V.3.0 User Manual, Multi Tenant Version: CR 1998, 1999, 2000, 106 pages.

Tian Jing, Introduction to Routing Policy of Call Center, Editorial Dept. Tianjin Communication Technol, Jun. 2003, No. 2, pp. 33-35 (in Chinese language).

Wisiorowski, Siemens Call Center Solution-Flex Routing, SIGMA NOT, 1999, vol. 72, No. 2, pp. 108-109 (in Polish language).

Feinberg et al., Operational Determinants of Caller Satisfaction in the Call Center, International Journal of Service Industry Management, 2000, vol. 11, No. 2, pp. 131-141.

Avaya Communication, CentreVu Advocate, Release 9, User Guide, Dec. 2000, Issue 1, Comcode 108869025, 234 pages.

Teamware Flow 3.1 User's Guide, Third Edition, Apr. 2000, Document No. PM16307EE, 164 pages.

IBM, IBM MQSeries Workflow, Concepts and Architecture, Version 33, Fourth Edition, Mar. 2001, 69 pages.

Ott, Marcus Conceptual Design and Implementation of a Graphical Workflow-Modeling Editor in the Context of Distribute Groupware Databases, University of Paderborn, May 1994.

Workflow Template, Using the WFT Development Environment Template Software, 1998, 140 pages.

Bea WebLogic Process Integrator—Learning to Use BEA Weblogic Process Integrator BEA, Jul. 2001, 212 pages.

Donald E. Brown, The Interaction Center Platform, White Pate, Interactive Intelligence, Apr. 6, 2001, 31 pages.

D. Steul, Redefining the Call Center: Customer Center on the Internet, Alcatel Telecommunications Review, Mar. 2000, 5 pages.

Siebel eBusiness Applications—Siebel Workflow Administration Guide, Siebel 2000, Ver. 6.1, Rev. A, Jun. 2001, 254 pages.

Belhajjame et al., A Flexible Workflow Model for Process Oriented Applications, Proceeding of 2nd International Conference on Web Information Systems Engineering (Kyoto, Japan), vol. 1, Dec. 3-6, 2001, pp. 72-80.

Stohr et al., Workflow Automation Overview and Research Issues, Information Systems Frontiers, Kluwer Dordrechnt, NL, vol. 3, No. 3, Sep. 1, 2001, pp. 281-296.

* cited by examiner

SYSTEMS AND METHODS FOR HANDLING A PLURALITY OF COMMUNICATIONS FOR DIFFERENT COMPANIES

RELATED APPLICATIONS

This application is a divisional application of and claims priority under 35 USC §120 to U.S. patent application Ser. No. 10/233,152, filed Aug. 28, 2002 now U.S. Pat. No. 7,962,644, by Ran Ezerzer et al. and entitled "SYSTEMS AND METHODS FOR HANDLING A PLURALITY OF COMMUNICATIONS," which claims priority under 35 USC §119 to Provisional Patent Application Ser. No. 60/379,955, entitled "Resilient Real-Time Internet Communications," filed May 10, 2002; Provisional Patent Application Ser. No. 60/365,890, entitled "Call Center Implementation," filed Mar. 18, 2002; and Provisional Patent Application Ser. No. 60/405,719, entitled "Call Center Implementation," filed Aug. 23, 2002, each of which is incorporated herein by reference in its entirety as if set forth in full.

BACKGROUND

1. Field of the Inventions

The field of the invention relates generally to communication networks and more particularly to the routing and handling of a plurality of communications based on a variety of factors.

2. Background Information

In today's communication age, a variety of what used to be face-to-face transactions now occur remotely via the telephone, email, or some other electronic communication medium. As a result, large organizations must be able to communicate with their customers or constituents in a variety of ways, e.g., via telephone, email, fax, the Internet, etc. This places a tremendous burden on such organizations to handle the communications in an efficient, effective, and reliable manner. Failure to do so can be very costly. For example, organizations that fail to optimally manage their communications can incur increased costs in dealing with the communications or lost business due to their unresponsiveness. Thus, it is very important that organizations handle their communications as effectively as possible.

Organizations with more than trivial customer communication needs, for example, typically use call centers to handle the communications and to organize their sales and service teams. A conventional call center comprises a telephony server configured to receive a plurality of incoming telephone calls that are routed to various operators, or agents, for handling. The call routing is often under the control of a software application and, therefore, is accomplished via some amount of computer automation. A simple example would be a software program that routes an incoming call to the next available agent. More complex software can, for example, be configured to screen incoming communications, forward them to agents with appropriate skills, and maintain records related to the handling of the incoming communication.

Thus, when an incoming communication is received by the call center it is routed to an appropriate agent. The agent necessarily must have the appropriate equipment to handle the communication. For example, if the incoming communication is a telephone call, then the agent should have telephone equipment to handle the call. In addition, the agents often have some type of computer terminal or monitor interfaced with the call center on which they can receive information related to the incoming communication or with which they can access relevant information for handling the incoming communication. For example, the terminal can display an originating telephone number associated with an incoming telephone call. The terminal may also be used to access account information for the caller.

A conventional call center, therefore, generally comprises a telephony server configured to receive and route incoming communications, an application server interfaced with the telephony server and configured to run applications for automating the call routing, and a plurality of agents interfaced with the telephony server via communications handling equipment and possibly some type of data terminal. There are actually three types of personnel who typically interface with a conventional call center: 1) the agents who handle the incoming communications; 2) supervisors who monitor and assist agents; and 3) administrators who install and configure software and hardware necessary to handle the incoming communications.

A conventional call center can be very expensive because it must house all of the call center personnel and associated call handling equipment and terminals as well as the telephony and applications servers. The centralized nature of conventional call centers can have another negative consequence as well, in that a single failure or error can bring down all or a substantial portion of the call center. Down time can have a severe negative impact because a call center is often the main point of communication between a large organization and its customers or constituents. Even a brief interruption can result in numerous missed communications. Accordingly, it is important that a call center be highly reliable in order to prevent significant service interruption.

SUMMARY OF THE INVENTION

A distributed communication center configured to handle a plurality of communications includes a user zone, a web zone, and a network zone. The user zone includes a plurality of remote terminals that enable communication center personnel to remotely interface with the distributed communication center through the web zone. The web zone includes a web server configured to interface the remote terminals in the user zone with the network zone. The network zone includes one or more telephony servers and application servers.

In one aspect, communication center personnel interface with the distributed communication center remotely using a remote terminal and a simple, commonly available browser. The remote communication center personnel can download customized applications to their terminal if required. Alternatively, their terminal can already comprise any customized applications required. Accordingly, communication center resources can be distributed in a manner that can reduce costs and lead to more efficient handling of greater amounts of communications.

These and other features, aspects, and embodiments of the invention are described below in the section entitled "Detailed Description of the Preferred Embodiemnts."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
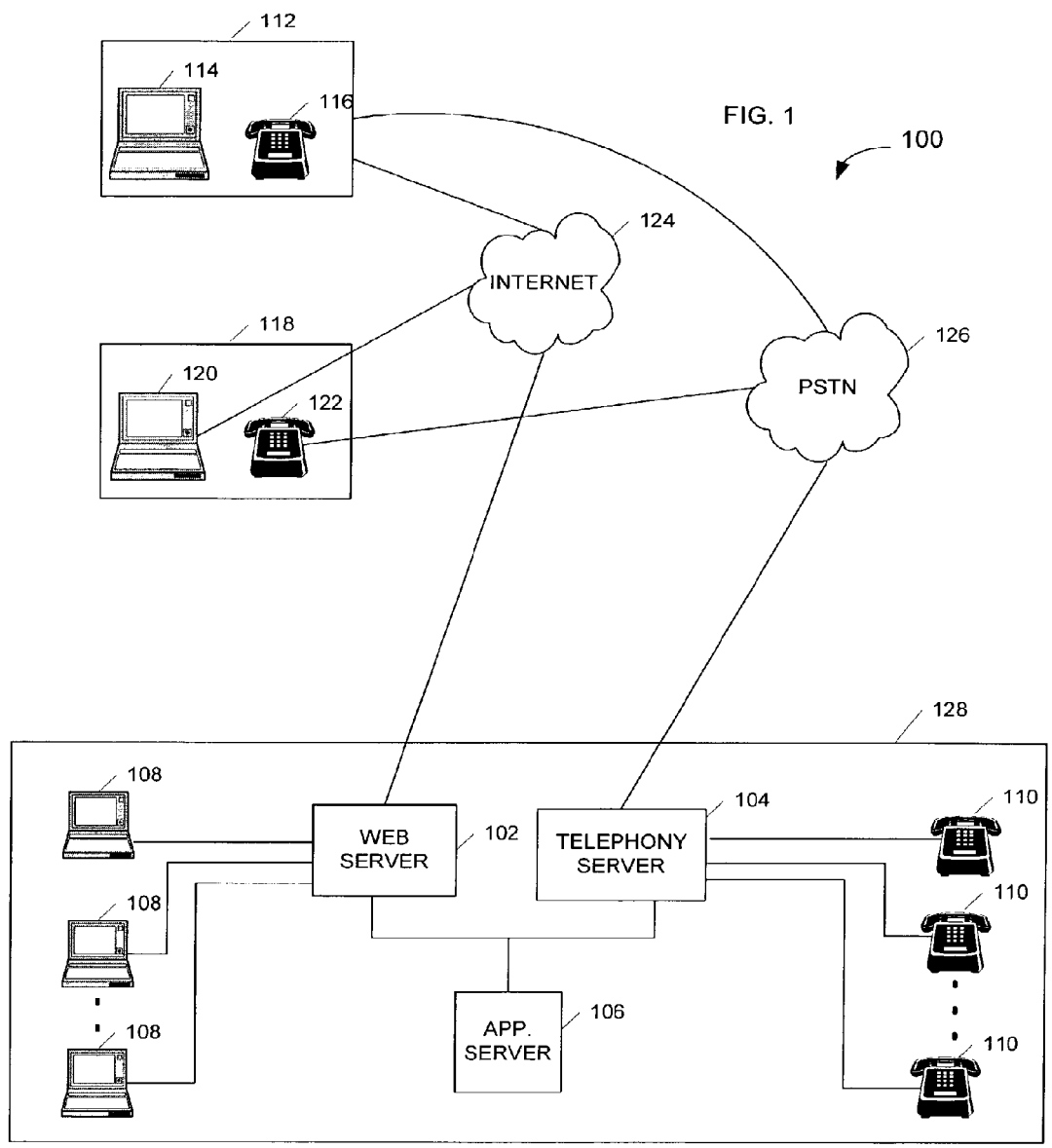
FIG. 1 is a diagram illustrating an example embodiment of a distributed communication center in accordance with the invention.

FIG. 1 is a diagram illustrating a communication system 100 configured in accordance with one example embodiment of the systems and methods described herein. Communication system 100 comprises a communication center 128. For many of the example embodiments described below, communication center 128 is a call center as described above. It should be noted, however, that although the systems and methods presented below may generally be described in the context of a call center, they are not necessarily limited to call center applications. Many of the systems and methods described can be applied to any communication system in which large amounts of incoming communications must be routed and handled. Accordingly, the examples provided below should not be seen to limit the systems and methods described to any particular application.

Call center 128 is interfaced with a plurality of remote sites, of which remote sites 112 and 118 are shown by way of example. Call center 128 is interfaced with remote sites 112 and 118 via one or more communication networks. In the example embodiment of FIG. 1, call center 128 is interfaced with remote sites 112 and 118 via a Public Switched Telephone Network (PSTN) 126 and the Internet 124. But networks 124 or 126 can also be, for example, any type of Wide Area Network (WAN), such as a wireless WAN, or some form of smaller Local Area Network (LAN).

Call center 128 comprises a telephony server 104 interfaced with PSTN 126. Telephony server 104 is configured to receive a plurality of incoming telephony communications. Call center 128 also comprises an applications server 106, interfaced with telephony server 104, that is configured to manage the operation of call center 128. Additionally, call center 128 can comprise a plurality of local terminals 110 interfaced with telephony server 104 and configured to receive the incoming telephony communications. For example, terminals 110 can be telephones or fax terminals.

Application server 106 can be configured to make intelligent decisions as to which agent should handle a particular incoming communication received by telephony server 104, or by web server 102 as described below, and then control servers 102 and 104 such that the incoming communication is routed to the appropriate terminal. Alternatively, application server 106 can be configured to control the operation of call center 128 such that the agent selected to handle a particular incoming communication is placed in contact with the associated customer, although not necessarily at the time the incoming communication is received. This is described more fully below.

Application server 106, telephony server 104, web server 102, and terminals 108 and 110 can be interconnected via some type of LAN, especially for implementations where all of the above components are housed in a control location such as a single building or a campus location. But as described below, some or all of the components can be geographically distributed in which case some type of WAN may be needed to interface some or all of the components that comprise call center 128.

Unlike conventional call centers, call center 128 also comprise web server 102 interfaced with the Internet 124 and configured to receive a plurality of incoming web-based or Internet communications. Web server 102 enables call center 128 to receive non-telephony communications, e.g., emails, which extends the capability of call center 128 and provides greater flexibility to the customers accessing call center 128. Thus, there can be a plurality of local terminals 108, e.g., computer terminals, interfaced with web server 102 and configured to handle, under the control of application server 106, the incoming web based communications. Terminals 108 can also be configured to display information related to the incoming communication or access information related to the customer associated with the incoming communication.

While, in the example of FIG. 1, server 102 is a web server interfaced with the Internet 124, network 124 can, in general, be any type of data network, and server 102 can be any type of associated data server. For example, server 102 can be any type of packet based data server, as opposed to the more traditional circuit switched servers associated with PSTN 126 and the like.

By including web server 102, call center 128 can actually be configured to handle a variety of incoming communications. The incoming communications can be any of a plurality of communication types using a plurality of communication protocols. Each different type of communication and/or protocol requires specific resources and methods to handle the communication. Some example communication types can be telephone calls, facsimile (fax) transmissions, emails, or Internet communications such as World Wide Web (web) based contacts. For the purposes of this specification and the claims that follow all of the different possible types of communications are generically referred to using the term "communications." Although it should be noted, that other similar generic terms, such as "interactions," "contacts," or "calls" can be used to refer to the different types of communications handled by a conventional call center, the one term "communications" is used herein for clarity and consistency.

The inclusion of web server 102 also makes it easier to geographically distribute call center personnel at remote locations, such as remote sites 112 and 118. This is because a simple web browser can be used to interface with call center 128. Call center personnel can, therefore, be located at remote site 118, for example, which comprises a terminal 120 configured to access web server 102. Terminal 120 can, for example, be a computer, a Personal Digital Assistant (PDA), or any other device configured to access the Internet 124. Thus, the agents, supervisors, and administrators associated with call center 128 can effectively perform their roles from anywhere in the world as long as there is access to the Internet 124.

Terminal 120 can be configured to handle incoming web-based communications under the control of application server 106. Terminals 120 can also be configured to access relevant information for handling the incoming communications. Remote site 118 can also comprise a terminal 122 interfaced with call center 128 via PSTN 126. Accordingly, an agent located at remote site 118 can handle any type of communication received by call center 128 just as though the agent were located at call center 128. Call center 128 can, therefore, be configured to receive an incoming communication either via the Internet 124 or PSTN 126 and then route that communication, under the control of application server 106 to an agent at a remote site, e.g., remote site 118, for handling. the agent can then use terminal 122 and/or terminal 120 to handle the communications.

Accordingly, the systems and methods described enable the configuration of a distributed communication center that can route any form of communication to any communication center personnel over packet or circuit switched networks, regardless of the location of the personnel, while providing the same functionality and visibility as if they were located in a centralized communication center 128. Such distribution of the call center functionality is enabled by the inclusion of web server 102 and the fact that web server 102 can be easily accessed from a remote site 118 without the need for complex or expensive equipment. All that is required, for example, is a terminal 120 with an appropriate web browser.

Figure 2:
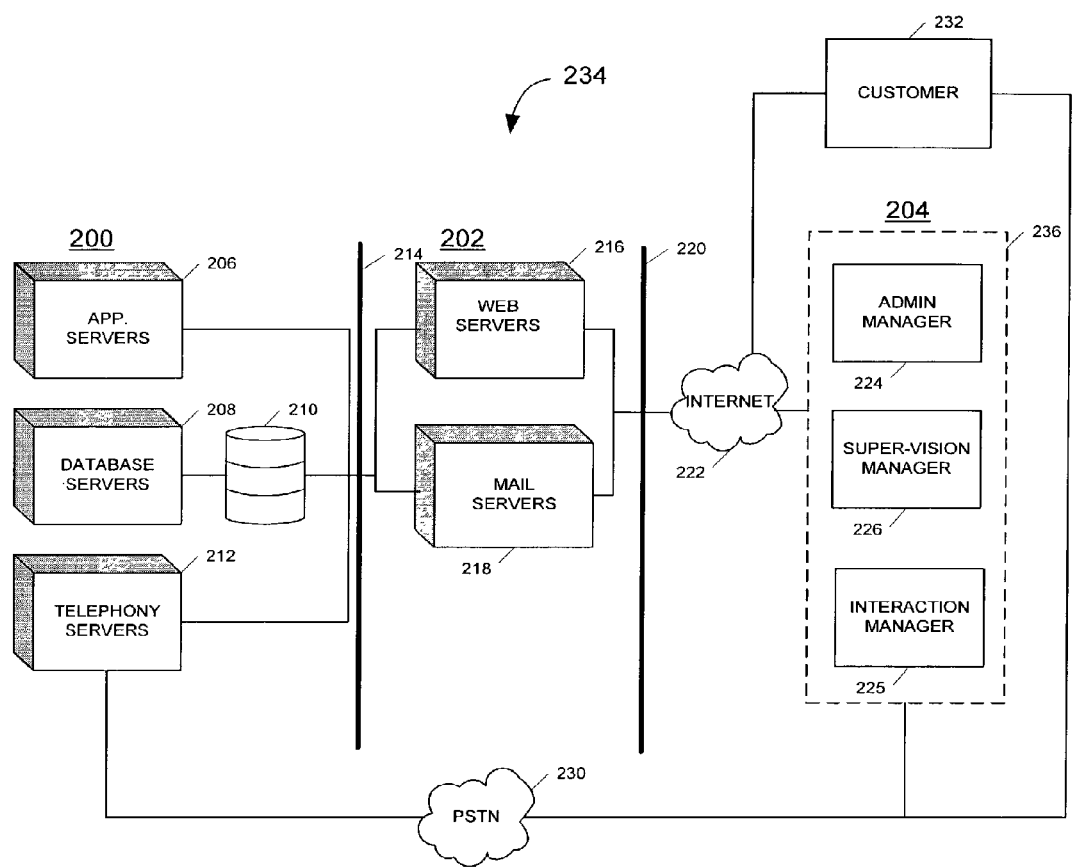
FIG. 2 is a diagram illustrating another sample embodiment of a distributed communications center in accordance with the invention.

FIG. 2 illustrates a distributed communication center 234 configured in accordance with one example embodiment of the systems and methods described herein. Communication system 234 comprises three zones, a network zone 200, a web zone 202, and a user zone 204. Network zone 200 can comprise an application server 206 configured to control the handling of communications and a telephony server 212 interfaced with PSTN 230. Application server 206 and telephony server 212 can operate in the same fashion as described above. Network zone 200 can also comprise one or more data bases 210 interfaced with database servers 208. Databases 210 can, for example, be configured to store customer account or historical information. Further, databases 210 can also be configured to store information related to communications handled by distributed communication center 234.

Web zone 202 comprises a web server 216 and can also comprise a mail server 218, although the functionality of the two types of servers can be combined into one physical server. Customers and communication center personnel can connect with web server 216 and/or mail server 218 through the Internet 222. Web server 216 can be configured to handle web-based communications generated by the customers or communication center personnel, while mail server 218 can be configured to handle email communications. Servers 216 and 218 can be interfaced with network zone 200 through a firewall 214 for security and network protection. Similarly, servers 216 and 218 can be interfaced with user zone 200 through a firewall 220.

User zone 204 comprises a plurality of remote sites, of which remote site 236 is shown by way of example. Communication center personnel can access web zone 202 or network zone 200 from remote site 236. More specifically, remote site 236 comprises the terminal equipment that can be used to access network zone 200, e.g., terminal 122 from FIG. 1, and web zone 202, e.g., terminal 120 from FIG. 1. In order to effectively access network zone 200 and web zone 202, the data terminal, i.e., terminal 122, located at remote site 236 can be loaded with one or more customized applications. For example, a communication center administrator can have an administration manager application 224 loaded on his terminal; a supervisor can have a supervision manager application 226 loaded on his terminal; and an agent can have an interaction manager application 228 loaded on his terminal. Example functionality of such customized applications is discussed in more detail below.

In addition to any customized applications, a browser application can also be loaded on to a communication center personnel's terminal 120 to enable contact with web zone 202. Thus, for example, the communication center personnel, e.g., an agent, can access web server 216 from a remote location 236 using the browser application. Once the agent has accessed web server 216, they can "logon" identifying themselves as an agent. Application server 206 can then direct web server 216 to direct the agent's browser to access a web page from which the agent can download a customized interaction manager application 228 for handling customer communications. Interaction manger application 228 can then, for example configure the agent's terminal 120 to display information related to handled communications within certain "windows" on the Agent's terminal, or it can enable the agent to access web pages on web server 216 that display certain information.

In one example embodiment, scripts or Java applets stored on web server 216 can be used to download the applications. Similarly, once downloaded, the applications can cause a script or Java applet to run that installs the application on terminal 120 and/or configures terminal 120 to run the application.

It should be noted that customers can interface with communication center 234 from customer location 232 in much the same manner as the remote communication center personnel. In other words, referring back to FIG. 1, remote site 112 can actually represent a customer location. Thus, the customer can, for example, use a telephone or fax terminal 116 to send communications via PSTN 126 to communication center 128. Alternatively, a customer can use a data terminal 114, such as a computer, to send communications, e.g., an email, through the Internet 124. Terminal 114 can also be used to access a web page on web server 102 using a web browser, for example. This ability allows communication center 128 to handled a variety of non-call center and non-telephony communications. For example, communication center 128 can be configured to handle on-line credit verification, ordering of goods and services, reservation booking, to name just a few.

The ability to connect to communication center 128 using the Internet 124, or more generically packet communications, enables the use of standardized communication protocols that are widely available, which avoids the need to use customized or proprietary protocols. For example, Internet Protocols (IP), such as Transmission Control Protocol/Internet Protocol (TCP/IP), can be used by customers or communication center personnel to access web server 102. IP allows web browsers to communicate with web server 102 using Hyper-Text Transfer protocol (HTTP), which is commonly used and commonly available. Therefore, these various protocols can reduce implementation and maintenance costs.

From a security standpoint, it can actually be preferable to use Hyper-Text Transfer Protocol/Secure (HTTP/S), which allows for secure communications using encryption and third party verification authorities or organizations. Such security ensures that only a desired and secure web server 102 sends information, e.g., web pages, to communication center personnel and customer web browsers. Further, "fingerprinting" methodologies, such as those offered by Verisign, Inc., can be used to ensure that only a desired and secure web browser can request information from web server 102.

Figure 3:
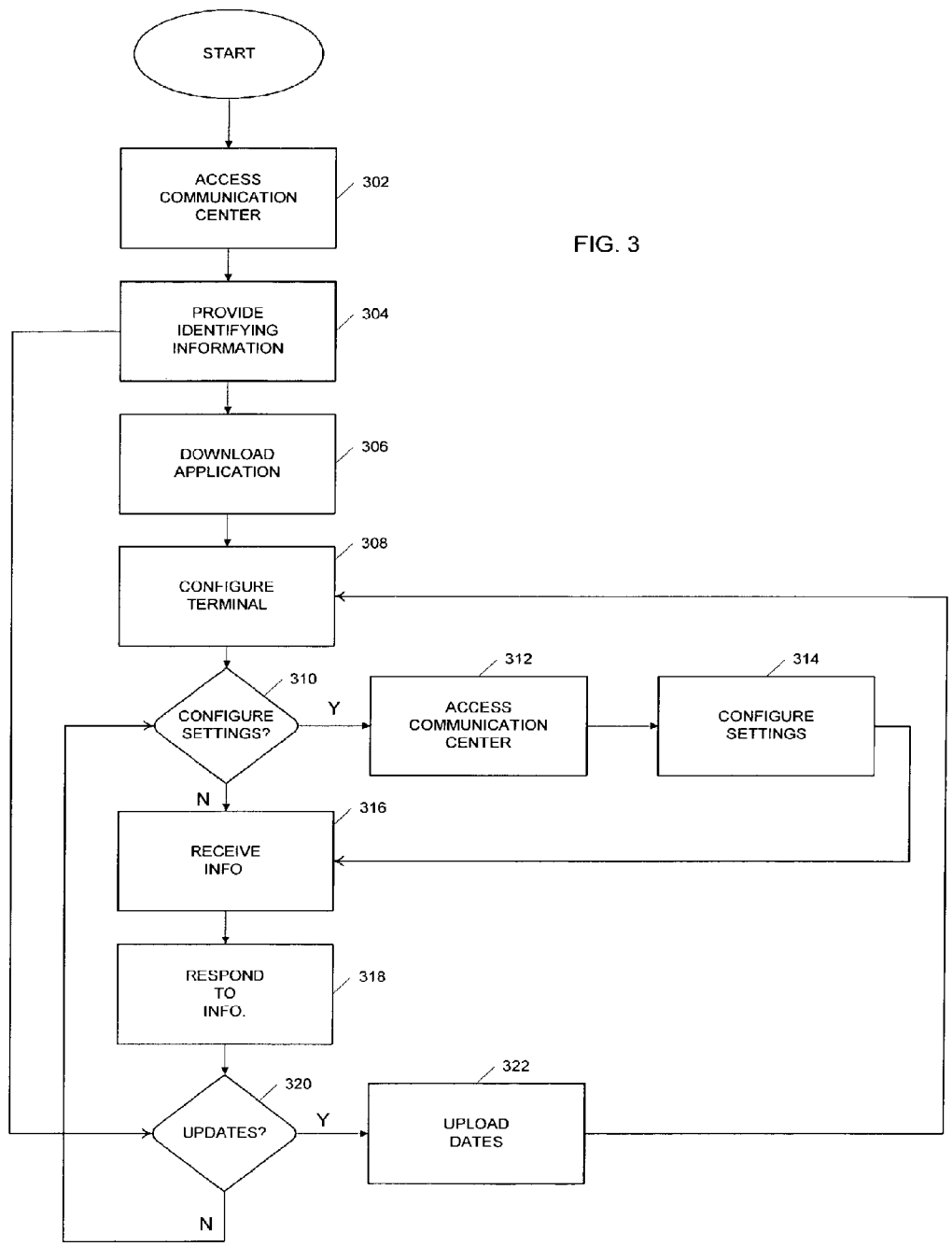
FIG. 3 is a flow chart illustrating an example method for accessing a web server included in the distributed communication center of FIG. 2.

TCP/IP, HTTP, and HTTP/s are just examples of some widely accepted protocols currently used in communication networks. These example should not, however, be seen as limiting the systems and methods described herein to any particular type of protocol FIG. 3 is flow chart illustrating one example process whereby remote communication personnel can interface with web zone 202 from a remote location 236. The process begins in step 302 with the remote personnel accessing web server 216 using, for example, a web browser. In step 304, the remote personnel provides identifying information to web server 216. The identifying information can be, for example, a user name or password. If on the other hand, a customer is accessing web server 216, then the identifying information can be, for example, account information or general contact information, e.g., address, telephone number, email address, etc.

Once the remote personnel has provided the identifying information, web server 216 should be able to classify them, e.g., as an agent, supervisor, administrator, or as a customer when it is a customer accessing web server 216. Once the remote personnel is classified, web server 216 can be configured to download any necessary applications, such as administration manager application 224, supervision manager application 226, or interaction manager application 228. Alternatively, web server 216 can be configured to direct the remote personnel to a web page from which they can download any requisite applications.

From a resource perspective, any applications running on the remote personnel's terminal are preferably small footprint applications. For example, this not only makes it easier and faster to download them if necessary, but it also reduces the resource requirements, e.g., memory and processing power, of the remote terminals. This allows the use of thin-client terminals at remote location 236 and customer location 232.

Alternatively, the remote personnel's terminal can already comprise all the necessary applications. In this case, web server 216 can be configured to determine, in step 320, if any application updates, i.e., new versions, have been generated since the application version loaded on the accessing terminal. If the answer is yes, then web server 216 can be configured to upload the updates, in step 322, to the accessing terminal, or direct the terminal to a web page from which the updates can be downloaded.

The ability to download applications or updates reduces deployment and maintenance costs because a technician does not need to be dispatched to each remote location 236 to configure each remote terminal. Similarly, applications or updates do not need to be mailed or distributed to remote communication personnel or customers. Rather, all that is required is a standard widely distributed browser or similar application.

After an application has been downloaded in step 306, or updates uploaded in step 322, the accessing terminal can be configured to run the application, in step 308. In other words, once a new or updated application is loaded on the terminal, the terminal needs to be configured to run the application. This can be accomplished, for example, by "rebooting" the terminal, or through a self-configuration of the terminal triggered by the download/upload, e.g., using scripts or Java applets.

The applications downloaded to the accessing terminal allow the terminal to receive certain information and/or resources related to the communications being handled by application server 206, and/or to perform certain functions in response to the received information/resources. There can also be settings associated with receiving the information/resources, such as how it is received, when it is received, or what specifically is received. Some of these settings are discussed in more detail below; however, in step 310 a decision can be made as to whether any such settings need to be configured now that the terminal has been configured to run the downloaded application in step 308. If the answer is yes, then in step 312 the terminal can access web server 216, using the web browser or one of the downloaded applications, and configure the settings in step 314.

Once the settings are configured, or if they do not need to be configured, then in step 316 the accessing terminal can begin receiving information related to communications being handled by application server 206. And, in step 318, the remote personnel or customer can then respond accordingly. For example, if the remote personnel is an agent, then he can begin receiving, under the direction of application server 206, for example, email communications sent in from customers through mail server 218. The agent can then respond to the emails if required, e.g., if the emails are product inquiries, then the agent can respond to the inquiries. If on the other hand, the remote personnel is a supervisor, then he can begin to receive information about the communications being handled by agents connected with web zone 202 and/or network zone 200. In certain embodiments, a supervisor can even download applications that allow them to see an agent's "desktop" in real-time. This functionality can be built into supervision manager application 226, or it can, for example, be a separate application such as a proxy remote gateway system application.

Figure 4:
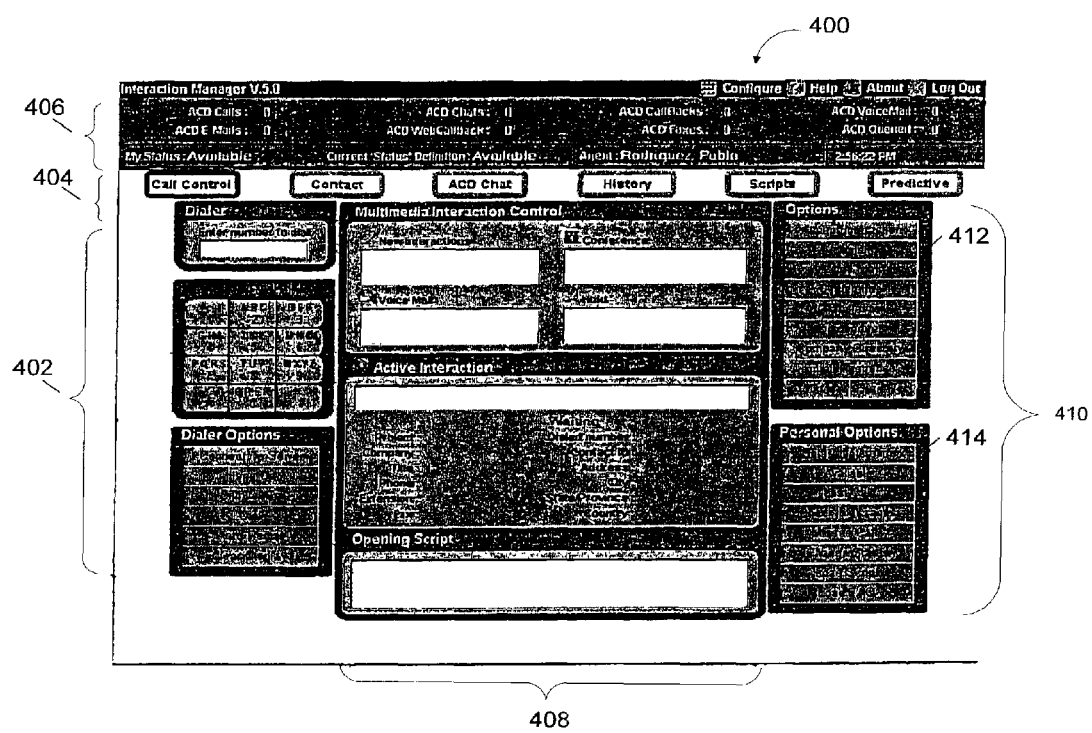
FIG. 4 is a screen shot of an example graphical user interface for an interaction manager in accordance with one embodiment of the invention.

Applications, such as administration manager application 224, supervisor manager application 226, and interaction manger application 228, allow the remote communication center personnel to handle communications received by communication center 234 from remote locations regardless of what type of communication it is, i.e., whether it is received via the interne 222 or PSTN 230. For example, interaction manger application 228 can enable an agent to respond to incoming communications as if the agent were sitting in a centralized call center 128. An example screen shot of a Graphical User Interface (GUI) 400 that can be associated with interaction manager application 228 is shown in FIG. 4. Thus, for example, interaction manager application 228 can be configured to display GUI 400 on terminal 120.

GUI 400 can be used to respond to a variety of communication types. For example, once an agent has accessed web server 216 and is connected within communication center 234, application server 206 can start directing emails received through mail server 218 to the agent. The agent can then view information related to the received emails in his GUI 400 display, for example, in a multimedia interaction control window 408. The agent can then respond to a received email communication via email. Alternatively, the agent an place a telephone call to the email sender if the sender's contact information is available.

Contact information, entered by a customer when they access communication center 234, can be displayed in GUI 400, e.g., in a portion of multimedia interaction control window 408. Additionally, in some embodiments, the agent can access information related to the sender, such as account or contact history. For example, a resource bar 404 can be included in GUI 400 that allow the agent to click on a button or indicator to access certain information related to the sender.

If the agent is going to place a telephone call, then the agent can, for example, place the call through PSTN 230, using a conventional telephone, e.g., terminal 122. Alternately, interaction manager application 228 can include a dialer application that enables the agent to use a terminal 120, equipped with the appropriate audio input, output, and processing, like a telephone. Such a dialer application can display a separate dialer screen, or the dialer screen can be incorporated into GUI 400. In the example of FIG. 4, GUI 400 does in fact include a dialer interface 402.

Thus, upon receiving an email requiring a response, the agent can for example, use dialer interface 402 to place a call to the sender. In order to place voice communications over the Internet 222, or any packet based network, a technology known as Voice over IP (VoIP) can be required. Accordingly, communication center 234 should be capable of handling VoIP if a dialer application is included in interaction manager application 228.

The call placed to the sender can be handled in a variety of manners. Often, the agent is connected via VoIP to network zone 200 and from network zone 200 to the sender via PSTN 230. In this case, network zone 200 should comprise the resources needed to convert between circuit switched communication and VoIP. If, on the other hand, the sender is capable of VoIP communication, then the connection can be purely VoIP through Internet 222.

Similarly, instead of an email communication, the incoming communication routed to the agent can be a telephone communication. The telephone communication can be a traditional circuit switched communication or a VoIP communication. If it is a circuit switch telephone communication, then communication center 234 can be configured to convert it to VoIP so that the agent can handle the communication using his dialer application. Alternatively, communication center 234 can be configured to route the call to the agent via PSTN 230 and the agent can handle the call using a traditional telephone. In the latter situation, the agent should still receive and be able to access information related to the call using GUI 400.

Figure 5:
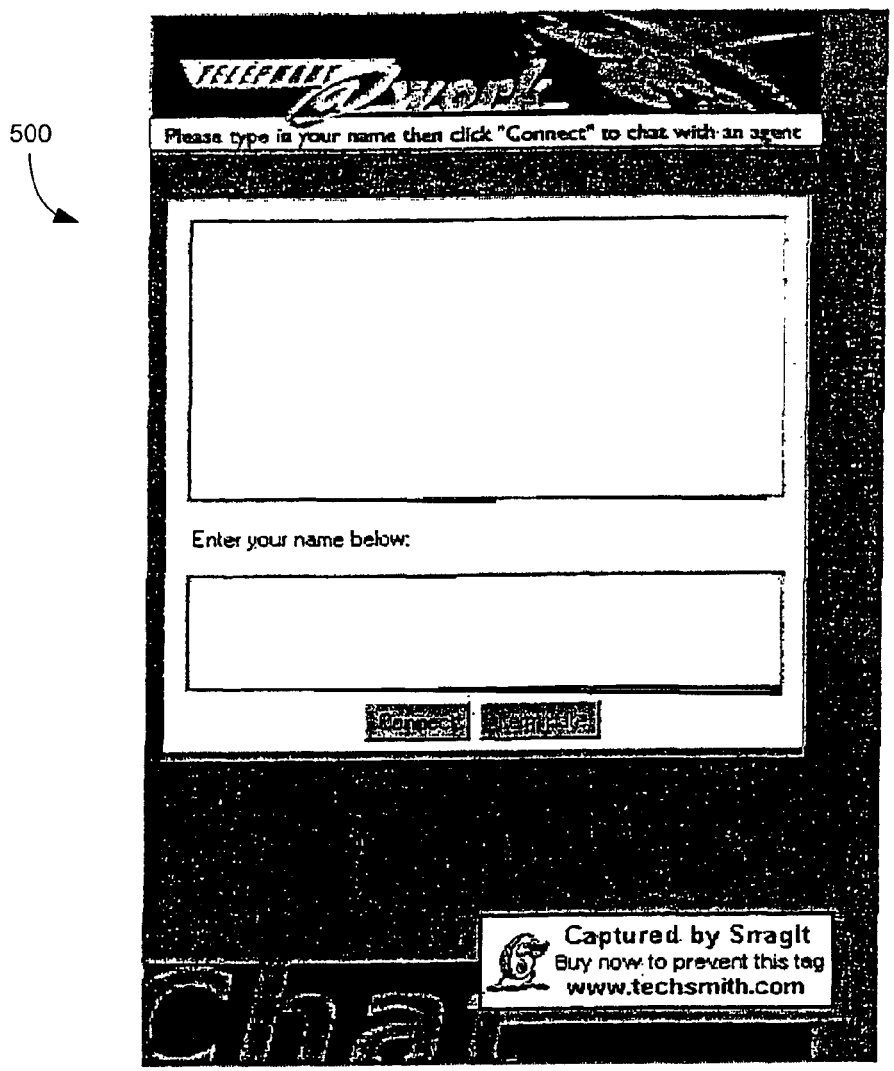
FIG. 5 is a screen shot of an example graphical user interface for a chat manager in accordance with one embodiment of the inventions.

Other example types of communications that can be received/handled using interaction manger 228 are faxes, voice mails, and Internet chat sessions. Some or all of these can be handled directly using interaction manger application 228 via GUI 400 or a separate display screen. For example, an exemplary Internet chat session managing screen 500 is depicted in FIG. 5. Some or all of the different types of communications handled by communication center 234 can be processed/re-encoded by communication center 234 as they pass through network zone 200, as with the VoIP-to-circuit switch and circuit switch-to-VoIP processing described above. The processing/re-encoding does not necessarily need to take place in real time. For example, a fax transmission can be received over PSTN 230 and stored electronically, e.g., in databases 210. The stored fax data can then be forwarded as an email to an agent through mail server 218.

Similarly, the routing of an incoming communication to an agent does not necessarily need to be done in real-time. Clearly, in the case of email communications, the emails can be gathered and forwarded periodically. With telephone communications, whether circuit switched or VoIP, the incoming telephone call can be received, the request or needs of the caller determined, and the call disconnected. An appropriate agent can be selected and separate communications can be established between the original caller and the agent. Once established, the two communications can be bridged so that the agent is now in direct contact with the original caller.

It should be kept in mind, however, that while the routing may not be real-time, the communications between agent and caller is a real-time communication once it is established. Thus, if VoIP technology is used, there must be mechanisms in place to ensure that the real-time communications are not disrupted. While this is not an easy task due to the nature of packet networks and packet communications, it can be done. Systems and methods for ensuring the real-time packet based communications are not disrupted are presented below. It should also be kept in mind, that while routing of communications may not be in real-time, there should be no additional delay introduced in the handling of communications that is due to the distributed nature of communication center 234. On the contrary, communication handling will often be sped up or made easier due to the availability of more agents and more ways to effectively communicate with communication center 234.

More agents can be made available, because the distributed nature of communication center 234 makes it easy to have a large number of agents connected. Further, the cost of having those agents connect is relatively low because they are not housed in a central location. Further, the thin client nature of the applications running on the remote communication personnel's terminals, the ease of distributing the applications and any updates, and the wide availability of the basic, i.e., browser, technology used to access web server 216, reduce the cost of establishing and maintaining communication center 234 and all of its remote sites 236. The reduced cost, therefore, also makes it easier to make more resources, e.g., agents, available to customers.

Returning to FIG. 4, it can be seen that a number of other resources and options are available to an agent through GUI 400. First, there is a status area 406 in which, for example, status concerning handled communications can be displayed. The status of the actual agent can also be displayed in the status area 406. In certain embodiments, remote agents can configure their availability using interaction manager application 228. The availability, as configured by each agent, can then be used in communication routing as described in detail below. Thus, the agents can preferably configure their status such that they are available or unavailable to receive new communications. The agents can also, depending on the embodiment, accept or deny communications routed to them, mute the communications on the agent's end, record the communications, put a caller on hold, transfer a caller, send a telephone call into voicemail, etc. The agent can also, for example check for received emails, voicemails, or faxes. One or more options toolbars can be incorporated into GUI 400 to aid in these types of activities. In the example of FIG. 4, area 410 comprises an options toolbar 412 and a personal options toolbar 414.

Figure 6:
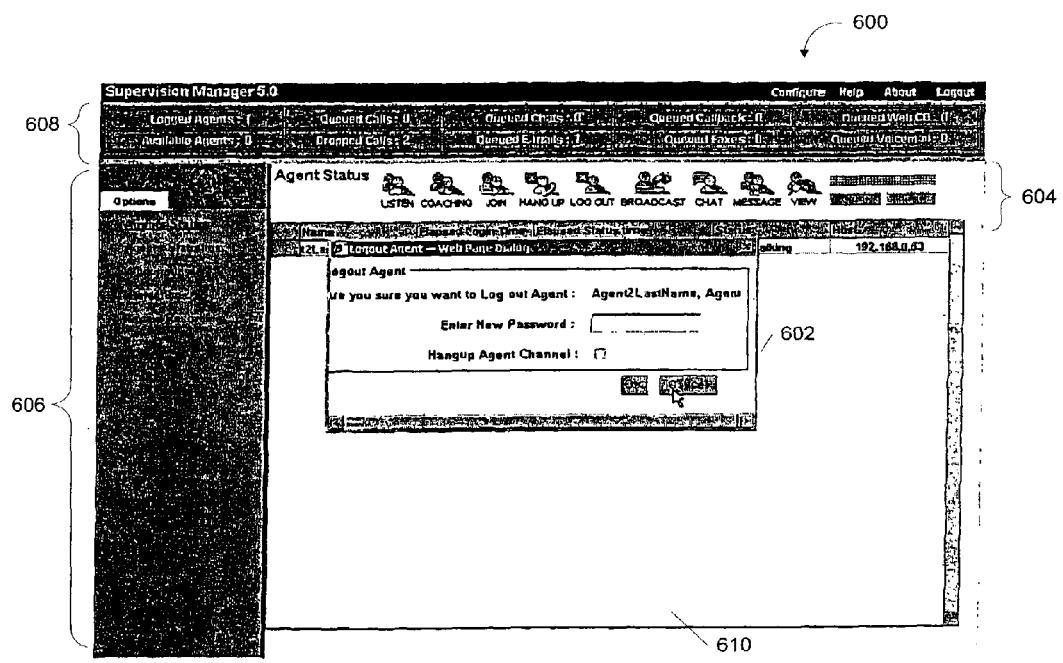
FIG. 6 is a screen shot of an example graphical user interface for a supervision manager in accordance with one embodiment of the invention.

An example screen shot of a GUI 600 that can be associated with supervision manager application 226 is shown in FIG. 6. Thus, for example, supervision manager 226 can be configured to display GUI 600 on terminal 120. As can be seen, GUI 600 can comprise a login screen 602. A supervisor can be required to input identifying information (step 304 from FIG. 3) before being able to access communication center resources using supervision manager application 226. Once a supervisor is logged-on, then the supervisor should be able to monitor agent handling of communications. A supervisor can, for example, monitor all agents handling communications received by network zone 200 and/or web zone 202, or some subset of agents. For example, if more than one company is hosted by communication center 234, then a supervisor can be allowed to monitor agents handling communications for only certain companies. Hosting is a concept that is discussed more fully below.

An agent status bar 604 can be included in GUI 600 from which the supervisor can perform different task related to his supervisory function. The status bar can be used to access functions, incorporated into, or separate from, supervision manager application 226 that allow the supervisor to listen in on telephone calls being handled by certain agents, coach certain agents as they handle communications, or join in the handling of certain communications.

For telephone communications, the coaching function preferably allows the agent to hear instructions from the supervisor but prevents the customer from hearing the supervisor. For non-telephone communications, the coaching function can simply allow the supervisor to send messages, e.g., emails, to the agent. Alternatively, the supervisor can just step in and respond to a non-telephone communication, i.e., join in the handling of the communication.

Other functions that can be accessed from agent status bar 604 can include a function that allows the supervisor to view non-telephone communication handling or even take control of an agent's screen, send messages to agents or customers, chat with agents or customers, broadcast a message to all agents and/or supervisors, or some subset of agents and/or supervisors, log-out agents so that they must contact the supervisor to log back in, capture an image of an agent's screen, record an agent's conversation, whether verbal or electronic, and search from a database, e.g., one of databases 210, of previously recorded conversations, to name just a few. Supervision manager application 226 can be configured to display information related to these and other functions in display area 610 of GUI 600.

GUI 600 can also have a options toolbar 606 that allows the supervisor to access further functions or resources. GUI 600 can be configured, for example, to display a different toolbar 604 depending on which option is selected in options toolbar 606. Information related to handled communications can also be viewed in status area 608.

It should be remembered that supervisors can be allowed to act as agents as well; therefore, an interaction manager application 228 can be incorporated into supervisor manager application 226. In which case, GUI 600 can be configured such that the incorporated interaction manager application can be accessed from one of the toolbars included in GUI 600. Alternatively, a separate interaction manager application 228 can be loaded on the supervisor's terminal 120.

A communication center administrator, among other things, can configure application server 206 to make intelligent communication routing choices that address the business needs of communication center 234. For example, if a customer calls on a line dedicated to Spanish speaking customers of a car sales company, then application server 206 can be configured to route that call to an agent assigned to the car sales company and fluent in Spanish. Call routing is discussed more fully below; however, other application server capabilities that can be configured by a communication center administrator include defining agent profiles. An agent profile can specify skills, access rights, workgroup, supervisor, etc. and can be used in the routing of communications. A workgroup can be a group of agents working on the same type of communications, e.g., communications associated with a particular company hosted by communication center 234. A communication center administrator can also configure business rules for implementing certain communication routing strategies, touch tone menus to deliver communications to agents, workgroups, or some other entity, menu prompts, such as hold music or ring tones. A communication center administrator can also enable communication center 234 to collect customer information in touch tone menus, allow callers to listen to an estimated wait time, permit customers to request an automotive call-back, allow callers to leave voice mail messages for agents or workgroups, and manage the communication center's service level.

Service level management can include running real-time reports spanning from agent level to a global view of all activity occurring in communication center 234. A communication center administrator can also configure communication center 234 to re-send communications, such as emails or fax transmissions, that failed in the first attempt. A communication center administrator can also set call routing priorities based on the type of communication, urgency or importance of the communication or the customer generating the communications, and can configure overflow procedures when an agent or workgroup is inundated with more communications than it can handle.

Of course, all of the activities performed by a communication center administrator can be performed from a remote location using administration manger application 224. The ability to remotely configure application server 206 can increase response time, and reduce costs, because administrators do not need to be on site.

Figure 7:
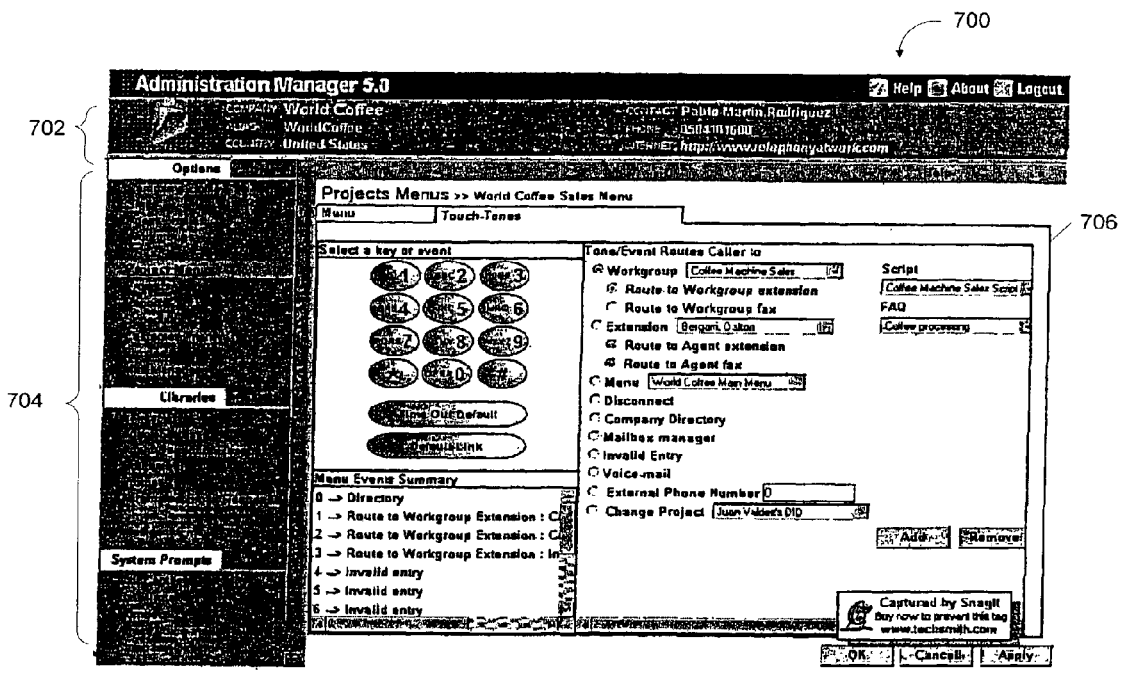
FIG. 7 is a screen shot of an example graphical user interface for an administration manager in accordance with one embodiment of the invention.

An example screen shot of a GUI 700 that can be associated with administration manager application 224 is shown in FIG. 7. GUI 700 can include an options toolbar 704 configured to allow the administrator to remotely access information, resources, or functions used to configure application server 206 by selecting one of the options in options toolbar 204. In the example of FIG. 7, GUI 700 also includes a display area 706 in which administration manager 224 can be configured to display information and controls related to the options selected in options toolbar 704. GUI 700 can also have a status bar configured to display information such as information related to the specific customer for which the administrator is configuring the functioning of application server 206.

Figure 8:
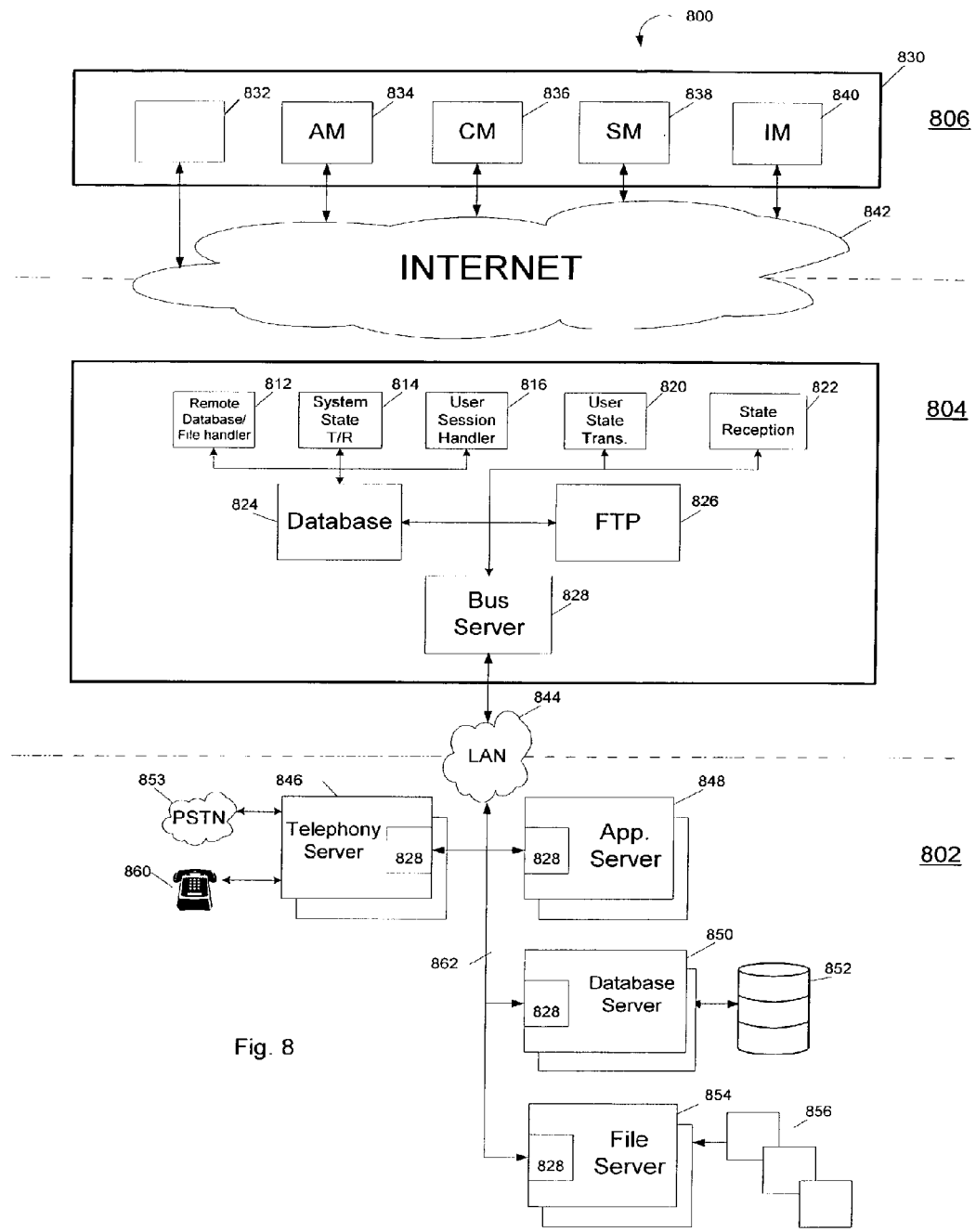
FIG. 8 is a diagram illustrating another example embodiment of a distributed call center in accordance with an embodiment of the invention.

For purposes of illustration, the functional organization of applications that can be loaded on a web server, such as web server 216, is described in the following paragraphs in conjunction with FIGS. 8-17. FIG. 8 illustrates another embodiment of a distributed communication center 800 that includes a web server 810 in a web zone 804. Web server 810 and web zone 804 can be similar to web server 216 and web zone 202 from FIG. 2; however, it should be remembered that due to the distributed nature of communication center 800, web server 810 can be located anywhere, i.e., web server 810 does not necessarily need to be housed in the same location as network zone 802.

In one specific implementation, web server 810 can comprise a Sun Microsystems, Inc. computer loaded with the following software: A) Off-the-shelf web server software, such as BEA Systems, Inc.'s WebLogic® product; B) GUI applications, such as those illustrated in FIGS. 4, 6, and 7, that can be downloaded from web server 810; and C) other software and applications, some of which are described in the following paragraphs. This other software and applications can include "servlets," which are software applications that can be used to extend the capabilities of web server 810, such that web server 810 can, for example, be a real-time communications link between communication center personnel terminal 830, or customer terminals, and telephony server 846 and application server 848 of communication center 800.

As can be seen in FIG. 8, web server 810 can be interfaced with a remote terminal 830 through the Internet 842, and to network zone 802 through a LAN 844, which can be a wired or wireless LAN. Alternatively, LAN 844 can be replaced by some form of WAN including a wireless WAN, depending on the implementation and degree of distribution of communication center 800.

Figure 9:
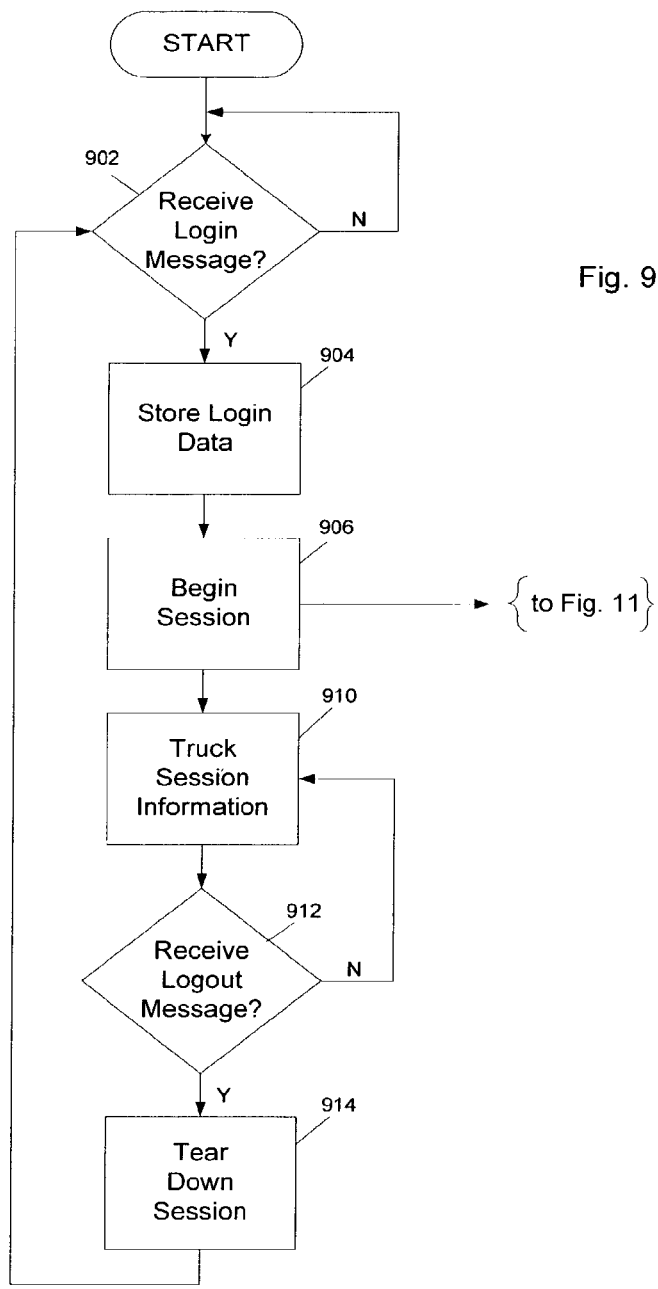
FIG. 9 is a flow chart illustrating an example method of operation for a user session handler application included in a web zone of the distributed communication center of FIG. 8.
Figure 10:
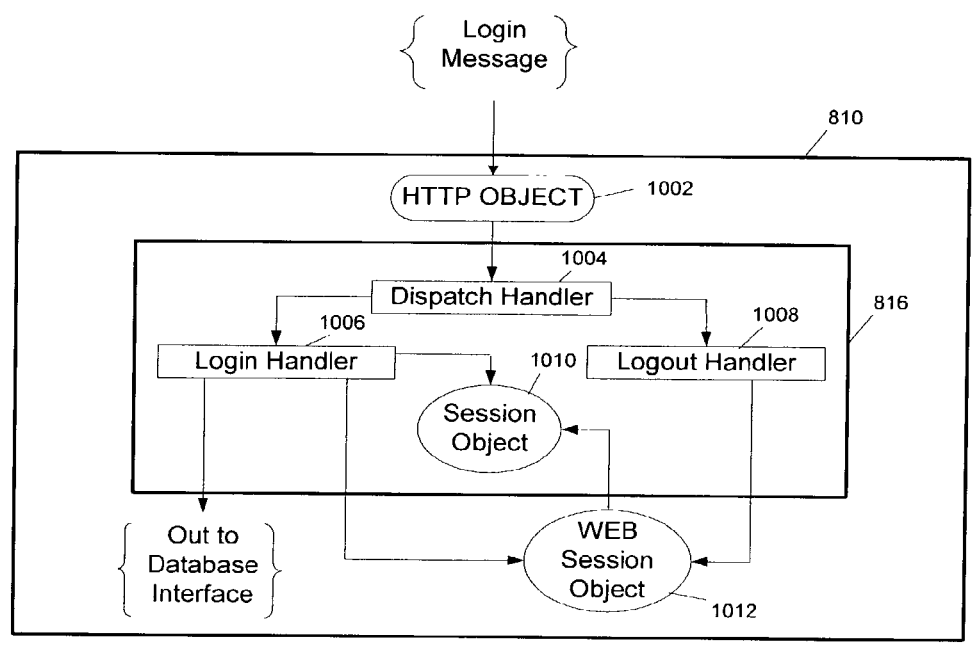
FIG. 10 is a logical block diagram illustrating example functions that can comprise a user session application configured to implement the method of operation illustrated in the flow chart of FIG. 9.
Figure 11:
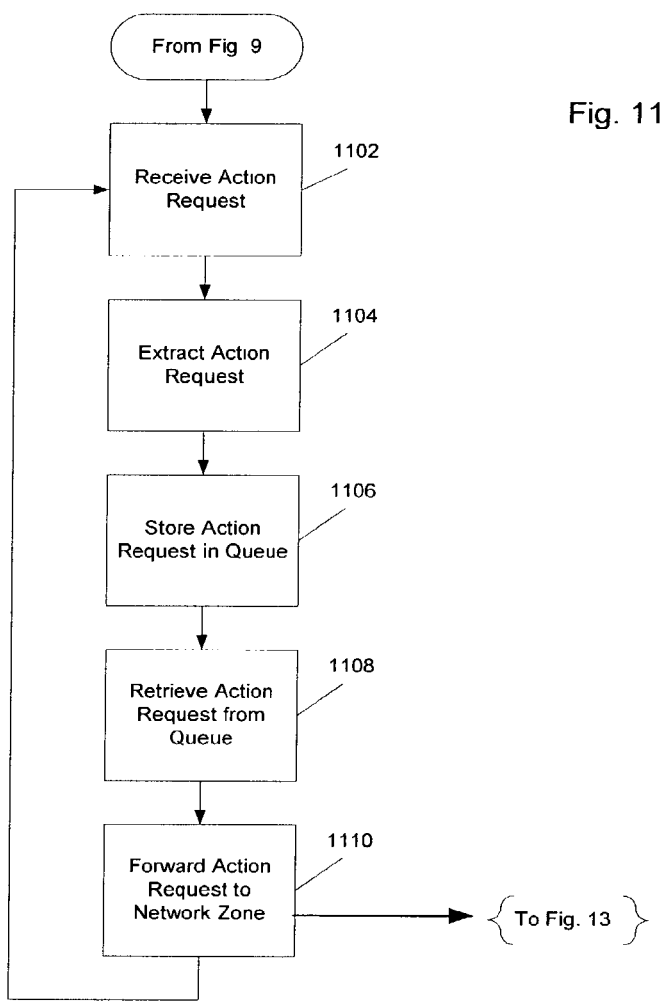
FIG. 11 is a flow chart illustrating an example method of operation for a user state transmission application included in a web zone of the distributed communication center of FIG. 8.
Figure 12:
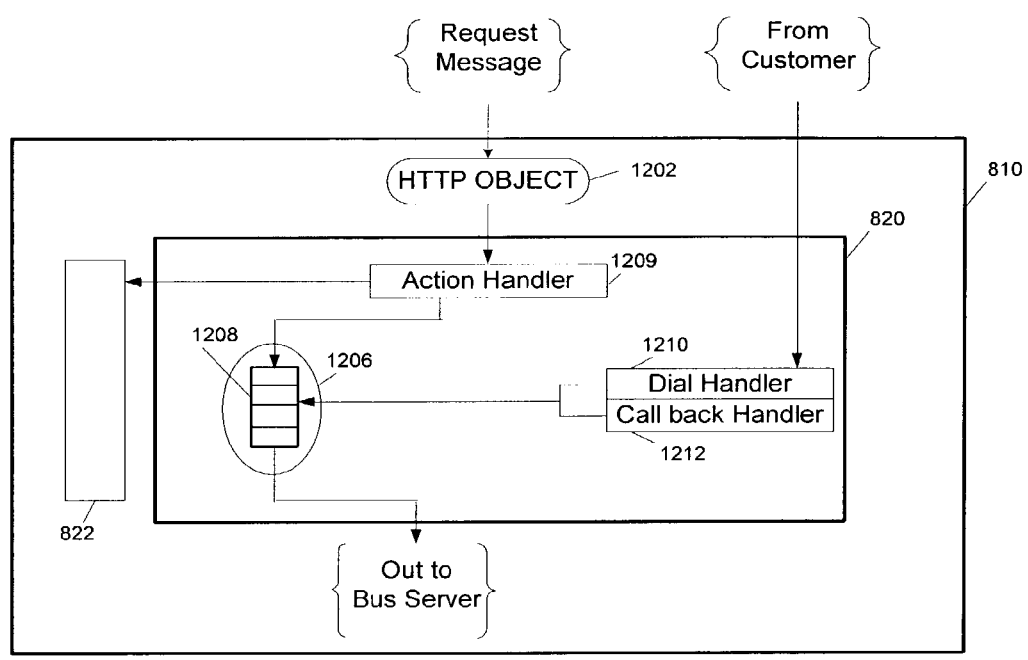
FIG. 12 is a logical block diagram illustrating example functions that can comprise a user state transmission application configured to implement the method of operation illustrated in the flow chart of FIG. 11.
Figure 13:
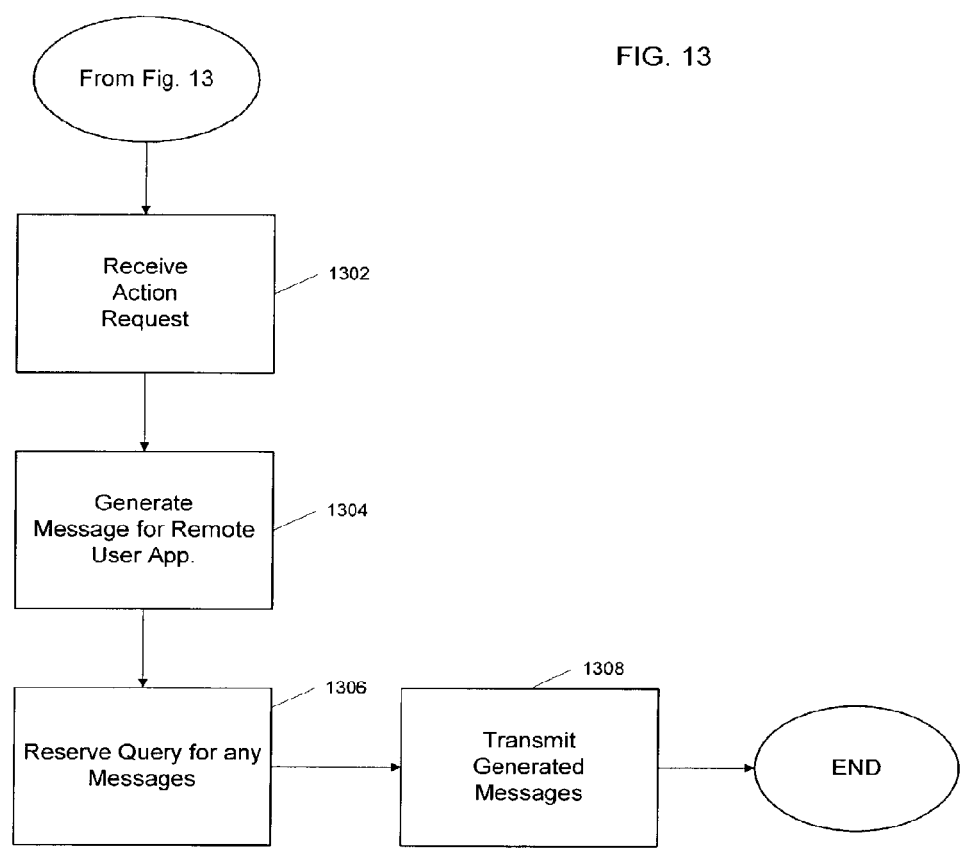
FIG. 13 is a flow chart illustrating an example method of operation for a user state reception application included in a web zone of the distributed communication center of FIG. 8.
Figure 14:
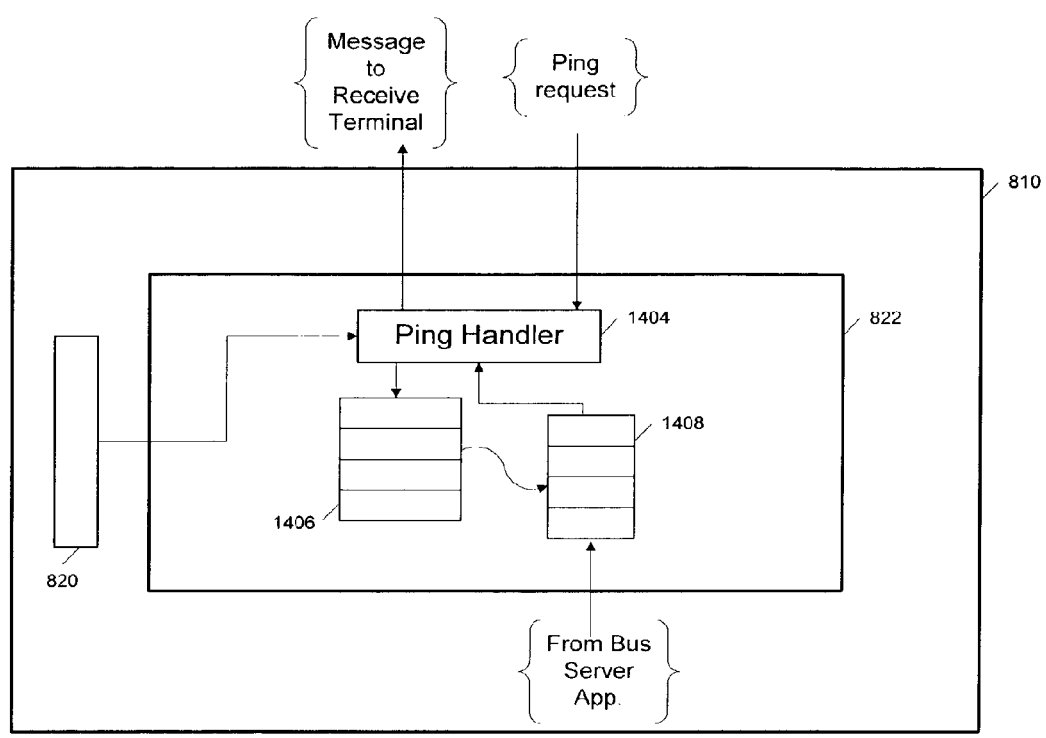
FIG. 14 is a logical block diagram illustrating example functions that can comprise a user state reception application configured to implement the method of operation illustrated in the flow chart of FIG. 13.
Figure 16:
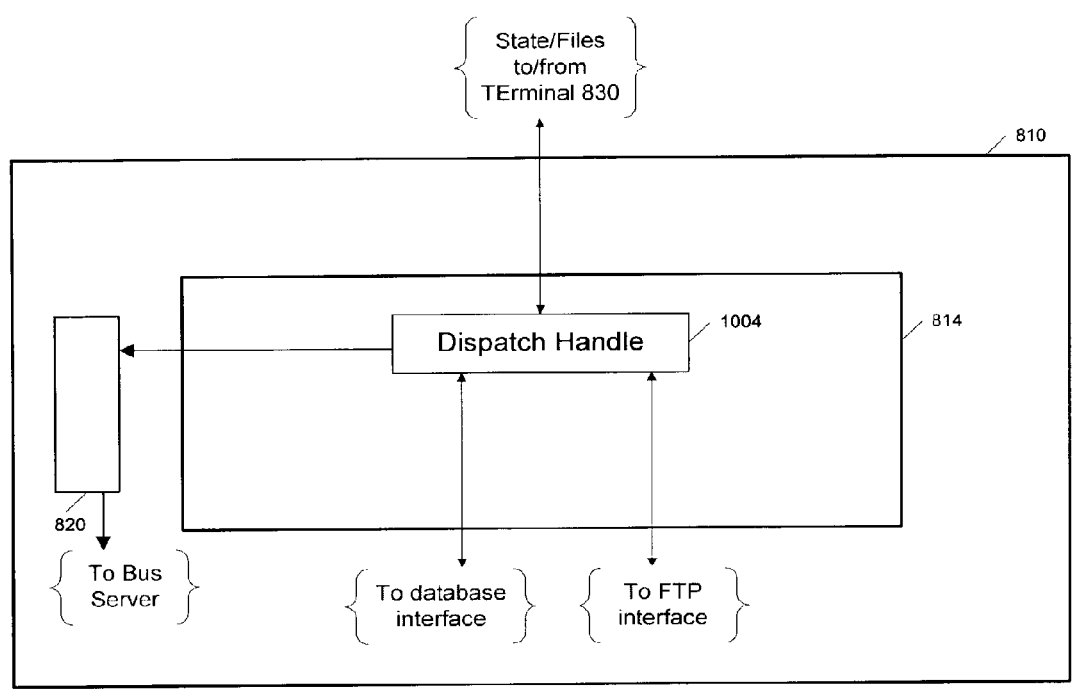
FIG. 16 is a logical block diagram illustrating example functions that can comprise a non-real-time system state transmission/reception application included in a web zone of the distributed communication center of FIG. 8.
Figure 17:
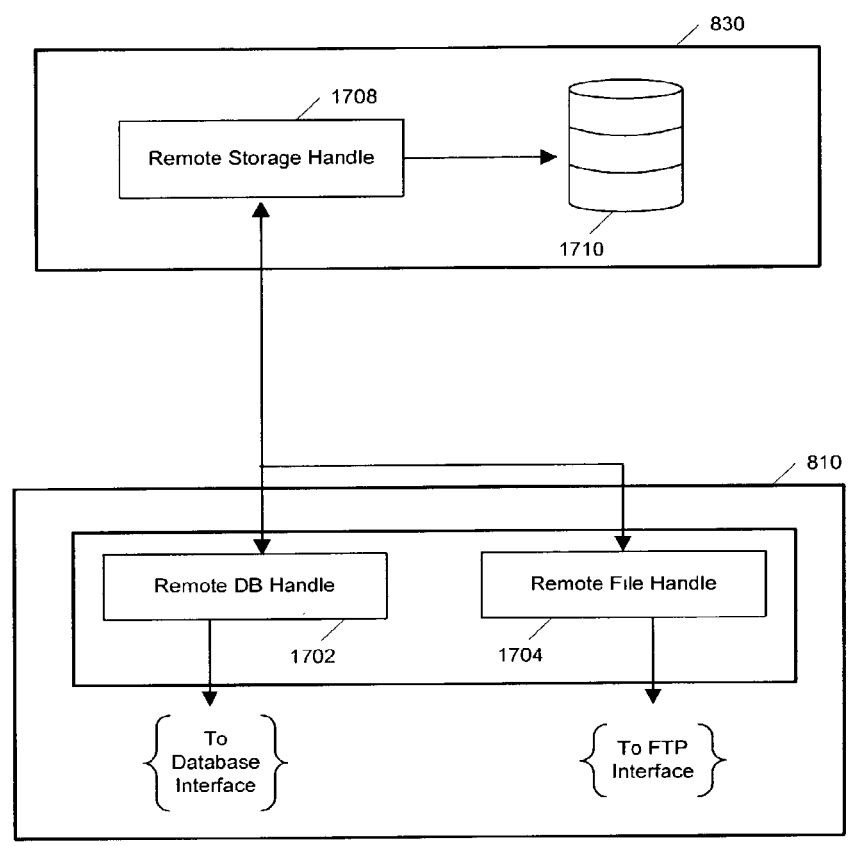
FIG. 17 is a logical block diagram illustrating example functions that can comprise a remote database/file handler application included in a web zone of the distributed communication center of FIG. 8.
Figure 18:
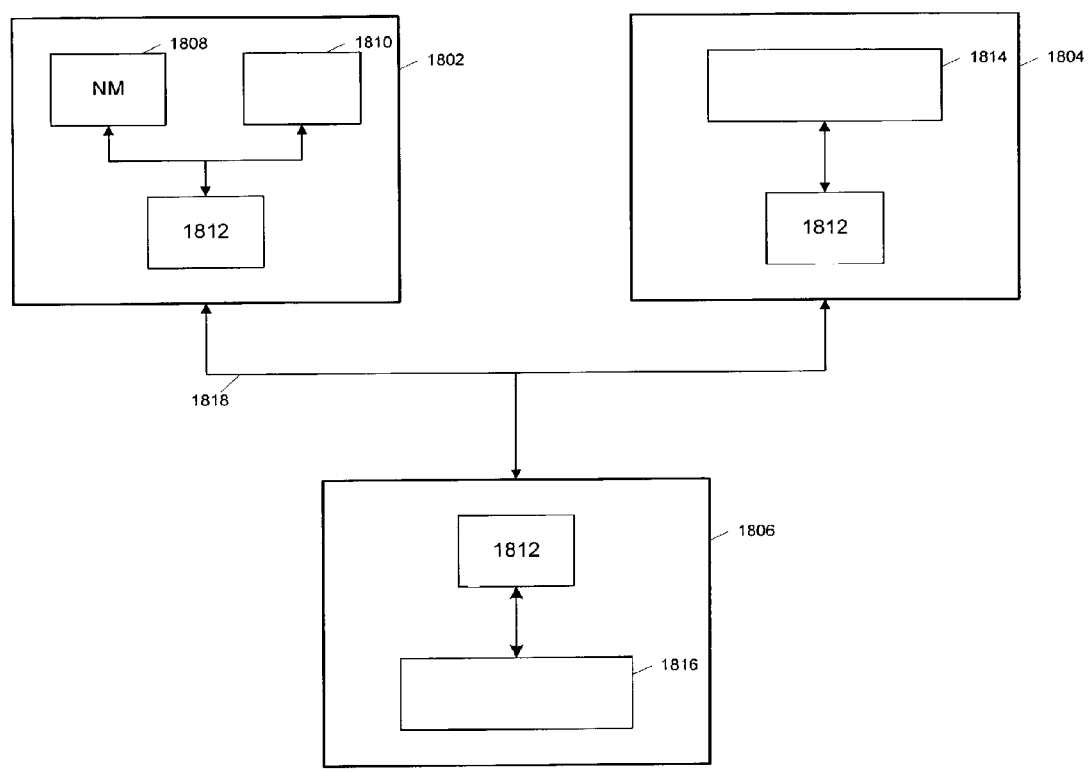
FIG. 18 is a logical block diagram illustrating the operation of an example embodiment of a bus server application included in a web zone of the distributed communication center of FIG. 8.

Web server 810 can comprise a plurality of functional applications, including:

1) a user session handler application 816, described in more detail in FIGS. 9 and 10, which can be configured to authenticate attempts to remotely utilize communication center 800 resources;

2) a real-time user state transmission application 820, described in more detail in FIGS. 11 and 12, which can be configured to relay the state of remote terminal 830 to telephony server 846 and application server 848;

3) a real-time user state reception application 822, described in more detail in FIGS. 13 and 14, which can be configured to relay the state of telephony server 846 and application server 848 to remote terminal 830;

4) a non-real-time system state transmission/reception application 814, described in more detail in FIG. 16, which can be configured to relay status for non-real-time communications to/from administration manager 483 through a database interface application 824 to/from a system database server 850, and through a FTP interface application 826 to/from a file server 854;

5) database interface application 824, configured to interface remote terminal 830 with database server 850;

6) FTP interface application 826 configured to interface remote terminal 830 with file server 854;

7) a remote database/file handler application 812, described in more detail in FIG. 17, configured to handle database and file requests from remote terminal 830; and 8) a bus server application 828, described in detail in FIG. 18, configured to manage the communication between web server 810 and the various components comprising network zone 802. In fact, a bus server application 828 can be included in each of the components, or hosts, of network zone 802 as shown in FIG. 8. Bus server application 828 is described in more detail below.

The applications running on remote terminal 830, e.g., interaction manager application 840, supervision manager application 838, chat manager application 836, administration manager application 834, and remote database/file acquisition manager application 832, can be configured to communicate with the applications running on web server 810 through the Internet 842 using, for example, HTTPS, e.g., on port 443, and/or HTTP, e.g., on port 80. "Ports" are points of entry into or out of a network. Two of the most common ports are, for example, the parallel and serial ports that are included on virtually every computer. Port numbers are often used to define, among other things, the type of resources that can have access to the port, whether the communications that take place through the port are encrypted, etc.

As explained above, it can be necessary for the remote terminal applications to maintain real-time communications with web zone 804 and network zone 806. For example, if interaction manager application 840 is engaged in the management of real-time communications, such as telephone calls or chats, then a real-time control link for the communication is preferred. To maintain such real-time communications, it can be necessary to fnain ta n persistent non-locking connections with web server 810, An advantage of non-blocking connections to an HTTP port is that they do not need to be reestablished for additional messages to be sent on that port, even if a response from web server 810 is not received. Moreover, persistent connections can reduce the time it takes to establish connectivity with web server 810 because each new connection can take as long as 7 seconds, which is unacceptable for a real-time communications system, HTTP Clients such as the one published by Innovation GmbH (Zürich, Switzerland) implement most of the relevant parts of the HTTP 1.1 protocol in a persistent non-blocking manner, including such request methods as GET, POST and PUT, and automatic handling of authorization, redirection requests, and cookies, Thus, depending on the application, it can be preferable to use such HTTP Clients in communication center 800.

FIG. 9 is flow chart illustrating an example process flow for a user session handler application 816 configured in accordance with the systems and methods described herein. User session handler application 816 can be configured to manage the creation and termination of user sessions on web server 810. Thus, when a remote communication center personnel first accesses web server 810 using terminal 830, user session handler application 816 can manage the logon and session creation functions. Thus, the process illustrated by FIG. 9 can begin, in step 902, with the reception of a login message received from a terminal 830.

If a login message is received in step 902, then in step 904 user session handler application 816 can be configured to store user identifying information contained in the login message. Then in step 906, user session handler application 816 can be configured to create a user session on web server 810. In step 910, information related to the user session can be tracked by user session handler application 816.

User session handler application 816 can be configured to continue to track information about the user session until a logout message is received in step 912. Once a logout message is received in step 912, then user session handler application 816 can be configured to tear down the user session in step 914 and wait for another login message in step 902. Although, in practice, web server 810 will often host several concurrent user sessions, therefore, it does not need to end one session before beginning another.

FIG. 10 illustrates the functional blocks of an example user session handler application 816 running on web server 810 and configured to implement the process illustrated in FIG. 9. Thus, upon user actions, applications running on terminal 830 can POST a message to the URL of an application running on web server 810 (step 902). Such a POST message can include user identifying information imbedded in the message, such as user name, user password, and company alias.

It should be noted that the term "user" is used to refer to the remote communication center personnel, e.g., agents, supervisors, and administrators, who use a terminal 830 to access web server 810. In certain instances it can also refer to a customer.

Web server 810 can be configured to store (step 904) the user identifying information in the form of an HTTP object 1002 from which a Proxy Dispatch Handler 1004 can query and extract the user identifying information. For instance, after a user enters his user name, user password, and company alias information at a login Java Server Page (JSP) displayed on terminal 830, and clicks OK, this information can be sent to the URL of Proxy Dispatch Handler 1004, which can then forward the information to a Proxy Login Handler 1006. Proxy Login Handler 1006 can query databases 852 through data base interface application 824 to verify the user identity. In a first query, a company ID for the user can be retrieved. With that information, a second query from Proxy Login Handler 1006 can fetch configuration and other information relevant to that user (e.g. actual user password, what workgroup he belongs to, etc.). Finally, Proxy Login Handler 1006 can be configured to check whether the password provided by the user is correct. If the username, password, and company alias combination provided by the user is not correct, an error message can be displayed on terminal 830.

If the user identifying information provided checks out, then Proxy Login Handler 1006 can be configured to create a (user) session object 1010 (step 906) to track (step 910) all relevant user session information while the user session persists. Session object 1010 can, for example, include a unique 64-bit session ID. Web server 810 can also be configured to keep a web session object 1012 to track information related to each connection with a remote terminal 830. Web server 810 can reference the session ID from web session object 1012. A reference is the Java name for the memory address of an object in memory.

When the user requests to logout (step 912), a Proxy Logout Handler 1008 can be configured to call a detach process for session object 1010, which effectively destructs session object 1010 (step 912) and nullifies the reference to it from web session object 1012. Proxy Logout Handler 1008 can also empty the user's Session Mailbox 1406 (see FIG. 14), which contains the user's outstanding responses from telephony server 846 and application server 848, delete temporary directories, e.g., recordings, emails, prompts, etc., associated with the session, and send a logout message to an Internet Handler function. It can also direct terminal 830 to a Logout page on web server 810.

FIG. 11 is a flow chart illustrating an example process flow for a user state transmission application 820 configured in accordance with the systems and methods described herein. After establishing a user session (step 906) to control communications, a user can send action request messages to web server 810. These action requests can be handled by user state transmission application 820 (see FIG. 8). Thus, in step 1102, user state transmission application 820 can receive an action request message. Such a message can include identifying information, such as described above, but also includes an action request. In step 1104, the action request is extracted from the message received in step 1102. The extracted action request can then be stored, in step 1106, in a queue to await handling. The action request can then be retrieved from the queue in step 1108. The action request can be retrieved, for example by bus server application 828 and forwarded to network zone 802, e.g., to telephony server 846 or application server 848, in step 1110.

The action request message can actually be generated by a customer as well. In which case, the action request can still be extracted and stored in the queue from which it can be retrieved and forwarded to network zone 802 as required.

FIG. 12 illustrates the functional blocks of an example user state transmission application 820 running on web server 810 and configured to implement the process illustrated in FIG. 11. A user can, for example use a GUI, e.g., GUI 400, 600, and 700, to press buttons such as "Dial," "Hold," "Transfer,' "Coach," and "Send." These actions create an action request message that is received (step 1102) by user session transmission application 820. In fact, there can be a plurality of instructions and data/responses that are sent from terminal 830 to web server 810 (and vice versa). The actions described above are by way of example only.

When the user performs an action, on his GUI for example, the user's application can send a POST message with a request object that includes user actions to the URL of a Proxy Action Handler 1204. Web server 810 can be configured to convert the request object into an HTTP Object 1202. Proxy Action Handler 1204 can then be configured to extract (step 1104) the action request portion from HTTP Object 1202 and store (step 1106) it in a Sender Queue 1208 of a Message Sender Object 1206. The stored action request can then be retrieved (step 1108) by bus server application 828 and sent (step 1114) to network zone 802 as needed.

As mentioned, In addition to communication center personnel action requests, customers can also, depending on the implementation, send real-time action requests to web server 810. For example, customers can initiate web-callback requests, which can for example include the customer's name and telephone number. Based on the web-callback request, communication center 800 can, for example, be configured to select a suitable available agent, call him, call the customer, and bridge the calls so the agent can assist the customer. Also, a $3^{rd}$ party application can use web server 810. For example, a $3^{rd}$ party application running on terminal 830 can use web server 810 to make telephone calls. These types of action requests can, for example, be sent to a Proxy Dial Handler 1210 or a Proxy Web Callback Handler 1212, which can forward the customer or $3^{rd}$ party application action requests to the same Sender Queue 1208 described above.

Proxy Action Handler 1204 can in certain implementations be configured to reply to the user's action request. In other implementations, the reply function can be delegated to a Proxy Ping Handler 1404 (see FIG. 14). Proxy Ping Handler 1404 can be part of a User State Reception application 822 as illustrated in FIG. 14, or it can be separate from User State Reception Application 822. Thus, Proxy Action Handler 1204 can be configured to send the user's session ID to Proxy Ping Handler 1404 to be used in responding to the action requests.

FIG. 13 is flow chart illustrating an example process flow for a user state reception application 822 configured in accordance with the systems and methods described herein. In response to action requests generated by terminal 830, customers, or $3^{rd}$ party applications, for example, telephony server 846 and application server 848 can generate and send messages to the applications running on terminal 830. The flow chart of FIG. 13 illustrates one example process whereby these messages can be generated.

First, in step 1302, an action request is received, e.g., by Proxy Action Handler 1204. As explained in FIG. 11, step 1110, the received action request can be forwarded to network zone 802 if required. The network zone can then generate a message in response to the received action request in step 1304 if a response or message is required. Once a message is generated in response to an action request, it can be forwarded to the terminal 830 generating the action request. In the example process flow of FIG. 13, this involves receiving a query from the particular terminal 830 as to whether any messages are present in step 1306. Thus, in step 1308, the messages generated in step 1304 can be forwarded to the particular terminal 830 for which the messages were generated and from which the query was received in step 1306. Of course, if there are no messages waiting when a query is received in step 1306, then nothing should be forwarded in step 1308.

FIG. 14 illustrates the functional blocks of an example user state reception application 822 running on web server 810 and configured to implement the process illustrated in FIG. 11. As can be seen, a Proxy Ping Handler 1404 receives, from a terminal 830, a query as to whether any messages 1408 have been generated and are present. If messages have been generated, then they can be stored on web server 810. A session mailbox 1406 can be used to access the stored messages 1408. For example, session mailbox 1406 can comprise a plurality of vectors, each identified with a different terminal 830, or remote communication center personnel. Each vector can point to a memory address where messages 1408 for the associated terminal 830 are stored. Session mailbox 1406 can be referred to as a hash table and Proxy Ping Handler 1404 can be configured to use the session ID to access the hash table that is session mailbox 1406. Further, messages 1408 can also, depending on the implementation, be in the form of a vector themselves.

Proxy Ping Handler 1404 can then retrieve all the messages for a particular terminal 830 using the vector obtained from session mailbox 1406 and forward them to the particular terminal 830. The retrieved messages 1408 can, for example, be in the form of a byte array or in the form of a TCP/IP stream.

Figure 15A:
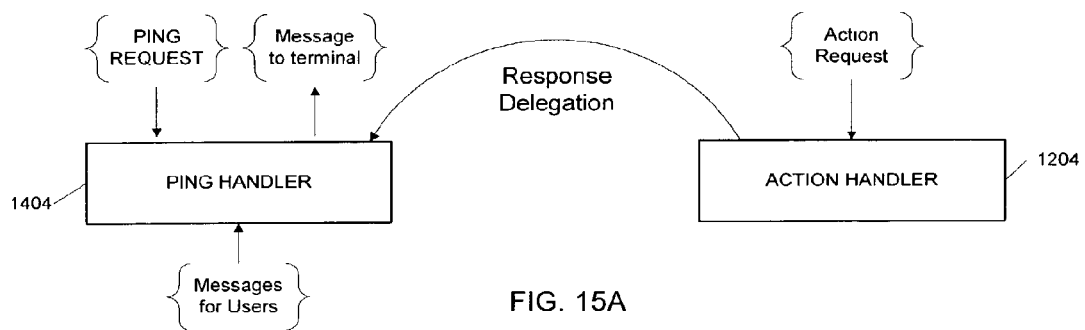
FIG. 15A is a diagram illustrating a conventional pinging methodology that can be implemented in the distributed communication center of FIG. 8.

The process described can be termed a "pinging methodology," i.e., a terminal 839 pings (queries) Proxy Ping Handler 1404 periodically and receives any stored messages in response to each ping. A conventional pinging methodology can, however, be inefficient. For example, FIG. 15A illustrates a conventional ping methodology. First, as has been described, Proxy Action Handler 1204 receives and action request from a terminal 830. Then Proxy Action handler 1204 generates a response delegation message that is forwarded to a Proxy Ping Handler 1404. It should be remembered that Proxy Action Handler 1204 can be configured to handle responses instead. Proxy Ping Handler 1404 then periodically receives pings from a terminal 830. Proxy Ping Handler 1404 responds to each ping, including any messages retrieved with each response. If the pinging period is short, for example every 2 seconds, then the pinging methodology illustrated in FIG. 15A can generate an excessive amount of message traffic.

Figure 15B:
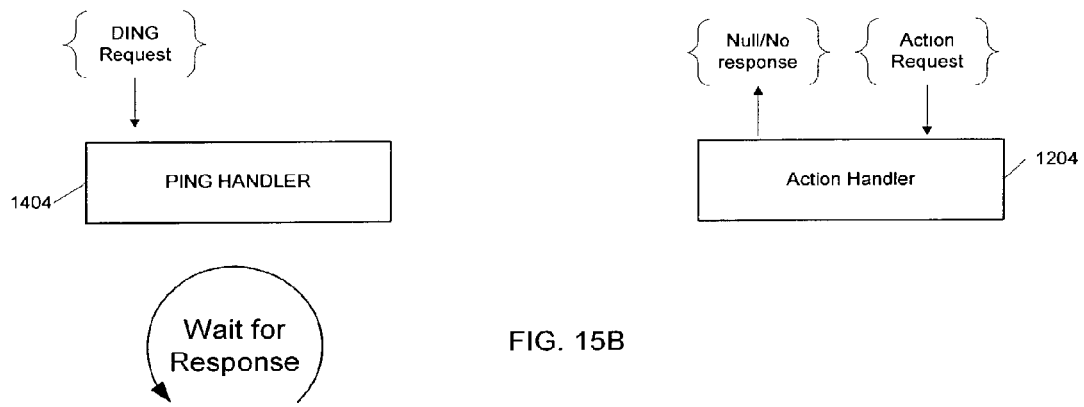
FIG. 15B is a diagram illustrating an example method of a pinging methodology that can be implemented in the distributed communication center of FIG. 8 in accordance with an embodiment of the invention.

The pinging methodology of FIG. 15B can be used to alleviate some of this traffic. In FIG. 15B, Proxy Action Handler 1204 receives action requests as before. But instead of generating a response delegation message, Proxy Action Handler 1204 simply responds with a "null response" or generates no response at all, depending on the implementation. Terminals 830 are still configured to ping Proxy Ping Handler 1404 as before, but instead of responding to each ping, Proxy Ping Handler 1204 is configured to wait for a configurable period, e.g., 60 seconds or less, for any messages generated for the pinging terminal 830. If there are messages present on web server 810, then Proxy Ping Handler 1404 can immediately forward them and then receive another ping from the same terminal 830. If there are no messages during the configurable period, then Proxy Ping Handler 1404 will not send a response until after the configurable period. Thus, Proxy Ping Handler 1204 will not receive another ping from the same terminal until after the configurable period has expired. Thus, the same, or better, level of responsiveness can be achieved with greater messaging efficiency.

FIG. 16 illustrates the functional blocks of an example non-real-time system state transmission/reception application 814 running on web server 810 and configured to handle non-real-time commands from terminal 830. Such commands often fundamentally consist of additions, deletions, and/or modifications of communication center 800 configuration data. As the user makes changes to the configuration data, Proxy Dispatch Handler 1004 can, for example, be configured to present the user with new JSPs as necessary. In certain embodiments, the changes, or new configuration data, can be entered in the form of parameters without any programming. In other words, any changes or new data is simply input, e.g., through an administration manager GUI 700 and then uploaded into network zone 802, which is configured to automatically configure communication center 800 to implement the changes.

Therefore, the changes, or new data, should be entered/viewed from a system database, such as databases 852. Therefore, any such requests can be forwarded from a terminal 830 to a database interface application 824, which is further described below. In the event that the user uploads a system state file, e.g., mail, fax responses, IVR prompts, greetings, etc. Proxy Dispatch Handler 1004 can be configured to add a message to the message sender queue within a user state transmission application 820. The added message can notify all hosts in the system that such a file is being transferred via FTP interface application 826 to file server 854, and that they can retrieve the file from file server 854 if they are configured to do so. For example, it can be desirable for all telephony servers 846 to have local access to voice greetings so they can more quickly retrieve them when they receive a telephone call.

Database interface application 824 can comprise a databasePool, which can be a web server object dedicated to communications with a configurable database server 850. The dedicated communications can occur on a dedicated port, depending for example on the brand of database software utilized. When an application needs to communicate with database server 850, the application can ask web server 810 to load the required drivers, e.g., Java Data Base Connection (JDBC). These drivers can be configured to administer a pool of connections that the application can borrow to communicate with database server 850.

It can be necessary for users to upload/download files to/from network zone 802 through web server 810. Therefore, FTP interface application 826 can be included on web server 810 as illustrated in FIG. 8. FTP interface application 826 can be configured to provide resources, such as GET and PUT, that can be used to move files back and forth from the hosts, i.e., components, in network zone 802. FTP interface application 826 can be an instantiation of a Java FTP class that can, in addition to moving files from one server to another, be configured to log vital statistics associated with file moves into databases 852.

For their part, network zone hosts can comprise Operating System software with built-in FTP functionality to make file reception/transmission possible. For example, a user can use an administration manager GUI 700 to upload a greeting, e.g. "Hi, welcome to . . . ", or "for sales, press 1 . . . ," to be played when a customer calls communication center 800. A file containing such a greeting can be uploaded to web server 810, using for example some sort of POST HTTP message. From there, the file can be distributed by a FTP interface application 826 to telephony servers 846. Telephony server 846 can then be configured to play the greeting when a customer call comes in to an associated telephone number.

Further, for example, a call center supervisor can record an agent-customer conversation using his supervision manager GUI 600, and the supervisor may want to play and review the recorded conversation. The recording can, for example, take place in telephony server 846 that hosted the communication between agent and customer. For the supervisor to listen to the recording, an FTP interface application 826 can be used to move the recorded file from telephony host 846 to web server 810, from which it can be serially downloaded to the supervisor's terminal 830.

In some situations, for privacy reasons for example, a company hosted by communication center 800 can desire to store some or all of its data and information on company systems instead or in addition to storing the data and information in communication center 800. To accomplish this, a remote database/file handler application 812 can be included in web server 810 as illustrated in FIG. 8. FIG. 17 illustrates the functional blocks of an example remote database/file handler application 812 running on web server 810. When implemented, for example, if a user desired to view a list of available, e.g., pre-configured, system faxes, his interaction manager application 840 can be made aware of a local database 1710 included in his terminal 830, which in this case can actually be a server itself. Interaction manger 840 can be configured to query local database 1710 instead of system database 852, which can also greatly improve system performance. This is because, interaction manger 840 does not need to go through web zone 804, network zone 802, and back to perform the query.

Remote terminal 830 can also include a Remote Storage Handler 1708 that can be configured to ping a Proxy Remote DB Handler 1702 included on web server 810 to authenticate the connection and establish a session. Following authentication and session establishment, Remote Storage Handler 1708 can be configured to periodically ping web server 810 to get a status update on any company user/client communications, e.g., when they occurred, for how long, contact information, etc. Proxy Remote DB Handler 1702 can be configured to get the information, in response to the pinging, through the database interface application 824. Remote Storage Handler 1708 can be configured to then store the information in the company's local database 1710. If the retrieved company information has files associated, e.g., consent-to-transaction recordings, faxes, emails, etc., Remote Storage Handler 1708 can be configured to ping Proxy Remote File Handler 1704 to obtain the files. Proxy Remote File Handler 1704 can be configured to obtain any such files, in response to the pinging, through FTP interface application 826. Remote Storage Handler 1708 can then store the files in a configured location in database 1710 for example.

Bus server application 428, which can be configured to run on web server 810 and the various components of network zone 802, can be important in allowing the various components to communicate with each other and web server 810 in real-time. FIG. 18 is presented to facilitate an understanding of bus server operation. FIG. 18 is a logical block diagram illustrating the operation of bus server applications 1812. In the example of FIG. 18, there are three hosts 1802, 1804, and 1806, each with its own bus server applications 1812. Hosts 1802, 1804, and 1806 can, for example, be a web server 810, a telephony server 846, and an application server 848; however, the host can also be any type of host in any type of communication system in which hosts are interfaced via a network 1818. Network 1818 can, for example, be a LAN.

Initially, one bus server application 1812 can be started automatically, e.g., a web server can start a bus server application 1812 as part of its configured startup process, or an the operating system of an application or telephony host can, after a bus server application 1812 has been installed, start the installed bus server application 1812 as a service. In certain embodiments, the bus server application 1812 that is initially started resides on a host that is configured to manage multiple resources. For example, host 1802 in FIG. 18.

A bus server application 1812 can also be initially started manually via a network manager application 1808 for example. Network manager application 1808 can also be configured to start other applications anywhere in the system, e.g., applications 1810, 1814, and 1816.

In a communication network, especially a distributed communication network, certain applications on certain hosts may be written in one language, while other applications on other hosts are written in another. For example, applications 1808, 1810, and 1814 can be written in the C++ programming language, while application 1816 can be written in Java. This can often cause communication problems. To alleviate this problem, bus server applications 1812 can be configured to use TCP/IP for all inter-Bus communication and inter-application communications over LAN 1818. Thus, the intrinsic native communication difficulties that arise for applications written in different languages can be overcome.

The term "native communication" is used to describe the situation where one application "calls" another application's method or process. If the two applications are written in different languages, then native communication can be hindered, i.e., there is a native communication problem. Overcoming a native communication problem can be particularly important for communication center 800 implementations, because web servers, such as web server 810 often comprise applications dominated by code written in Java, while telephony servers 846 and application servers 848 often comprise applications dominated by code written in C++. Thus, the TCP/IP inter-bus configuration described above can be preferable for communication center applications, because it can help to overcome the native communication problem.

Bus server applications 1812 can be configured to communicate with each other over a LAN 1818, or some other IP network, for example on port 9001. After each bus server application 1812 register with each other, they can be configured to communicate in pairs using certain sockets. Registration is the process whereby bus server applications announce to each other that they are managing the communications needs of an application, e.g., application 1808, 1810, 1814, or 1816, running on a host, e.g., host 1802, 1804, or 1806. In IP, a socket number identifies the virtual channel assigned to a set of applications for communicating with each other.

One form of registration that can be implemented by bus server applications 1812 is multicast registration. In multicast registration each host 1802, 1804, and 1806 establishes a connection to a pre-established network IP address that does not correspond to any host in the network. Each bus server application 1812 can be configured to then identify itself by sending, for example, its name, host name, and host IP address, to the pre-established network IP address. Bus server applications 1812 can be configured to then wait for other bus server applications 1812 to identify themselves by sending their information. The first bus server application 1812 to register will not receive a response from other bus server applications 1812, since it is the first to register. But the second bus server application 1812 to register should receive an identification response from the first registered bus server application 1812. The third bus server application 1812 should receive a response from the first two, and so on.

Alternatively, a unicast bus registration scheme can be implemented for bus server applications 1812. In this case, each bus server application 1812 searches a database for all registered bus server applications 1812, or for hosts that comprise a bus server application 1812.

After bus server applications 1812 become aware of other bus server applications 1812 in the network, they can be configured to establish socket connections to each other. It can, however, be desirable to minimize the number of sockets used. Thus, a scheme where the bus server application 1812 with the lower IP address always waits for the bus server application 1812 with the larger IP address to take action, or vice versa, can be utilized to minimize the number of socket communications generated. Other methods of reducing the amount of sockets used are discussed more fully below.

Once bus server applications 1812 on multiple hosts have registered, they can be configured to communicate directly over LAN 1818 using IP messages. Moreover, they can be used as communication conduits for applications residing on those hosts. For example, a network manager application 1808 residing on host 1802 can be configured to start application 1814 on host 1804. To make this possible, network manager application 1808 can be configured to send an IP message to its corresponding bus server 1812, which then would send that message to bus server 1812 residing in host 1804. The latter bus server 1812 can then be configured to spawn application 1814 in response to the received IP messages.

While direct inter-application communications can be utilized, for example to start and application as just described, the available sockets would quickly diminish, or the required number of sockets would be prohibitive, in large networks. In other words, if a socket were dedicated every time an application on one host needed to communicate with an application on another host, then the network would not operate very efficiently due to the limited number of sockets.

To avoid problems associated with the limited number of sockets, each bus server application 1812 can be configured to receive all communications from each application running on the same host, whether they are intended for other applications on the same or different hosts. If the communication is intended for an application on another host, then bus server 1812 can be configured to broadcast the message over LAN 1818 using TCP/IP. Thus, all other bus server applications 1812 on LAN 1818 will receive the broadcast messages; however, the other bus server applications 1812 will ignore received messages unless they are intended for an application on their associated host.

Accordingly, instead of each application being forced to communicate individually with a plurality of other applications on other hosts, each application can now simply communicate with one application, i.e., its associated bus server application 1812. The associated bus server application 1812 can then broadcast messages received from the applications on LAN 1818 or redirect the received messages to other applications on the same host as required. Such an approach can help reduce bandwidth limitation problems that result from limited socket availability. This type of bus scheme is also beneficial in terms of the hot backup system and methods described below.

Implementing the bus scheme just described should reduce operational overhead, memory, and bandwidth requirements for the network. It also allows the dynamic addition of new applications and hosts onto the network without stopping, recompiling, or otherwise disrupting network operation.

Network manger application 1808 can actually rely on bus server application 1812 to control the addition, modification/configuration, and stopping of applications and hardware within the network. A user can, for example, use a network manager GUI (not shown) to make any necessary system adjustments, which network manager application 1808 can be configure to then store in a system database using bus server application 1812 in real-time. In addition, since bus server application 1812 can be used by the network for all inter-application communications, a bus server application 1812 can be the most reliable source for real-time network information. Network manager application 1812 can also be configured to rely on a bus server application 1812 to become aware of the state of a given application within the network, e.g., running, stopped, etc. Such status information can, for example, be made visible using the network manager GUI, an can be stored in the system database.

Whenever a bus server application receives network information, by any means, it can be configured to distribute relevant information, e.g., a certain application being up or down, or a certain databases, such as user, company, or customer databases, being changed, to each application. Similarly, each application running in the network can be configured to notify its corresponding bus server application 1812 in advance of its information needs. Thereafter, the corresponding bus server application 1812 can be configured to filter information based on the needs of various applications, and distribute the filtered information accordingly.

Now that some example applications configured to run on web server 810 have been described, it should be pointed out that a communication center 800 can be configured to host the communications of a plurality of companies. Having their communications hosted on a communication center 800 allows organizations to lease infrastructure at a reduced cost from a Service Provider instead of buying their own equipment, generally referred in the industry as Customer Premises Equipment (CPE). To this effect, communication center 800 can be configured to: A) allow for software and hardware resources to be shared across companies or to be used for the exclusive use of a company, B) comprise a database structure for the handling of all companies, users and languages.

For security reasons, a communication center operator may have to ensure that it is not possible for the confidential data of one company to mix with the data of another company. Thus, hosting more than one company can present problems related to data and resource segregation. Clearly, one company may have information or data that they do not want intermingled with that of another company. For example, a company may not want the contact information, e.g., telephone number, email, etc., of its customers to be visible to another company. Also, a company may not want agents, or other communication center personnel, to handle their communications if they are handling communications for, or are somehow affiliated with, certain other companies.

To provide the segregation required, certain hardware, software, and database resources can be duplicated within communication center 800 so that each, or certain, companies have dedicated resources. For example, as illustrated in FIG. 8, there can actually be a plurality of telephony servers 846, application servers 848, database servers 850, and file servers 854. Thus, if required for example, a telephony server 846 can be dedicated to a specific customer hosted on communication center 800. As explained below, hardware duplication, or redundancy, can also be used to provide network resiliency.

Software resources can also be duplicated, so that certain customers have dedicated software resources that are segregated from the software resources of other companies. Software duplication, or redundancy, can also be useful for providing network redundancy, which again is addressed more fully below. Example web zone software applications have been described above. Some of these web zone applications can, therefore, be dedicated to a certain customer. This can involve duplicating the software applications or duplicating both the software applications and the hardware resources, i.e., web servers and/or mail servers. The duplicated resources can then be assigned to different customers.

Table 1, on the other hand, lists some example software applications, for a particular implementation, that can run on network zone 802. Certain of these applications can be dedicated to a certain company because they use or access confidential information. Table 1 also lists some commonly shared applications from the same example implementation. More information regarding the example applications listed in table 1 is provided below.

TABLE 1

| Dedicated Resource Name | Summary of Resource Function |
|---|---|
| Internet Handler (IH) | Maintains communication between real-time user GUIs and the hosted application's network zone. |
| Automatic Call Distributor (ACD) | Maintains all of the Company specific project routing rules for voice, chat, and email projects. |
| Computer Integration (CTI) | Maintains communication between the ACD telephony resource and other application resources. Determines which available communication center resource to use for bridging the outbound leg of a voice call. |
| Chat Handler (CHATH) | Interfaces with the IM Server and ACD resources to provide for the handling of all ACD Chat and collaboration processes. |
| Email Distributor | Interfaces with the ACD resource and the Statistics Tracker and controls all ACD email functionality. |
| Statistics Tracker | Writes all communication-related information to the database. |
| System Scheduler | Alerts a Statistics Tracker to any changes that need to be made for project routing rules based on time parameters. |
| Predictive Caller | Allows for the systematic calling of selected customers. |
| Shared Resource Names | |
| Host Manager (HMGR) | Sets up host data structures used for storage of history files, quality recordings, and generates email and chat sessions. |

TABLE 1-continued

| Dedicated Resource Name | Summary of Resource Function |
|---|---|
| Call Handler (CALLH) | Controls telephony hardware connected to a telephone company's central office, and communication center agents. Plays prompts and makes quality recordings. |
| Call Bridge (CALLB) | Controls the routing of calls across any number of telephony servers. |
| Unified Messenger (UMGR) | Attaches fax (e.g. .tiff) files and sound (e.g. .wav) files for use as system fax and voice mail resources. Tracks e-mails with errors. |
| License Manager (LMGR) | Keeps track of communications available to a company and to keep track of the status of all resources. |
| Simple Network Manager (SNM) | Allows for simple network management protocol compliance for remote monitoring of system alarms, performance, and controlling of system resources. |

The need to ensure information confidentiality, and to make sure that communication center 800 is scalable, can result in various divisions, and duplication of resources. For example, in a small CPE implementation, it may be possible for a single software application to take on all the functions of a CTI, Call Handler, and Call Bridge. But if information needs to be segregated, then it can be important to have a CTI that is dedicated to each company. Conversely, from a system scalability point of view, a Call Bridge that is shared and which can control effective use of an ATM switch can be preferred.

If multiple companies are hosted, it can also be preferable to partition and segregate customer data in databases 852. It should be noted that such partitioning can be done in conjunction with the use of a plurality of database servers 850 if required. To aid the partitioning and recovery of data, each hosted company can be assigned a unique Company ID. This Company ID can then be associated with all data elements stored in databases 852 relating to the associated company. The following paragraphs detail some example databases that can be used to maintain effective management and segregation of data in communication center 800. Thus, the company ID described above can be associated with the data in the following databases to ensure appropriate management of the data.

First, a company database can include all information regarding a hosted company, e.g., users, contacts, workgroups, projects, libraries, communication information, etc. The information in a company database can, for example, be configured through an administration manager GUI 700.

A users database can also be included and can contain all information regarding users, e.g. administrator, agent, supervisor, etc., associated with a specific company, or company ID. The user database can include agent personal information, skill ratings, telephone assignments, media restrictions, user status definitions, etc. The information in a user database can also be configured through an administration manager GUI 700.

A workgroups database can contain information regarding the workgroups configured by a company to handle its communications. Such information can include, for example, agent assignments to a workgroup, skill assignments, overflow routing, unique voice message assignments and ACD options for callers holding in queues. The information in a workgroup database can also be configured through an administration manager GUI 700.

A projects database can include all media communication routing schemes, including: voice, chat, email, web callback, predictive dialing, and preview dialing, instructions for how agents, menus, or workgroups communications are to be routed, project priorities, URL pages to be utilized for scripts, FAQs, web callback, and chat push pages. The projects database can also be configured through an administration manager GUI 700.

An interaction track database can include all information associated with any communication event for a company. It can, for example, include information such as project information, telephone information, agent assigned, duration, etc. The interaction track database can be an important database that is used for reporting purposes. The interaction track database can be updated through the Statistics Tracker software application associated with the corresponding company.

A contacts database can include all information regarding the contacts, e.g., call center customers, of a hosted company. This information can include data such as contact name, address, telephone number, etc. The information in the contact database can be managed through an interaction manager GUI 400.

A history database can include all the historical information related to any communications a hosted company customer has had with the company. This information can include agent names, communication outcome, type of communication, notes, chat and email transcripts, and agent initiated recordings. The history database can be updated through the Statistics Tracker.

A quality control database can include all call center quality control recordings. These can be agent-initiated recordings that are initiated, for example, using an interaction manager GUI 400, or supervisor-initiated recordings, initiated for example using a supervision manager GUI 700. The quality control database can be updated through the Statistics Tracker.

Other databases can, of course, be included depending on the requirements of a specific implementation. Accordingly, updates to databases 852 can occur in a variety of ways, including: A) direct user entry, such as configuration information entered through an administration manager application 834 or contact entry or update entered through an interaction manager application 840; B) system provided additions based on use of user functionality, such as interaction manager application 840 or supervision manager application 834 recordings; or C) direct system input, such as communication information from the Statistics Tracker application, which is described below.

The use of databases 852 with the systems and methods described herein can also make it possible to provide multi-language support, e.g., GUIs presented in the user's spoken language: English, Spanish, etc. through the use of multiple configurable language keys and pre-recorded prompts. This may be accomplished through the use of Java Resource Bundles. These Java Resource Bundles can be grouped by language and can, for example, consist of English to Foreign language translations, or KEYS, for each of the supported languages. Such Java Resource Bundles can be stored on web server 810. When a user logs into an application, e.g., user session handler application 816, he can select a language and a corresponding GUI. A message can then be sent to a JSP on web server 810, which can then associated a Language ID for the session. Information and data associated with the session can then be stored with the Language ID, so that communication center 800 knows to use the appropriate language for the session and possibly future related sessions.

Java Resource Bundles can be created from an administration manager application 834. This can, in certain implementations, be accomplished through the use of three database tables: a local keys database, a local language database, and local variants database. The local keys database table can, for example, contain the information associated with a resource bundle. Depending on the number of companies hosted and amount of communications, there can be tens of thousand of objects contained in the local keys database. The local language database can contain all of the languages supported by communication center 800. The local variants database can include all possible resource bundles and can enable the user to create them from scratch. Thus, by combining resource bundles, language, and information from these three databases, an administrator can, for example, create the Java Resource Bundles using an administration manager application 834.

Now that possible configurations and implementations for a web zone 804 have been explained in detail, some possible configuration and implementations for a network zone 1900 will be explained in conjunction with the example embodiment of FIG. 19. As can be seen, network zone 1900 includes database server 1912, file server 1914, application servers 1902, 1904, and 1906, and telephony servers 1908 and 1910. Each server can comprise standard server hardware and software as well as hardware and/or software configured in accordance with the systems and methods described herein. For example, the applications of table 1 can be included in one or more of the servers illustrated in FIG. 19.

Figure 19:
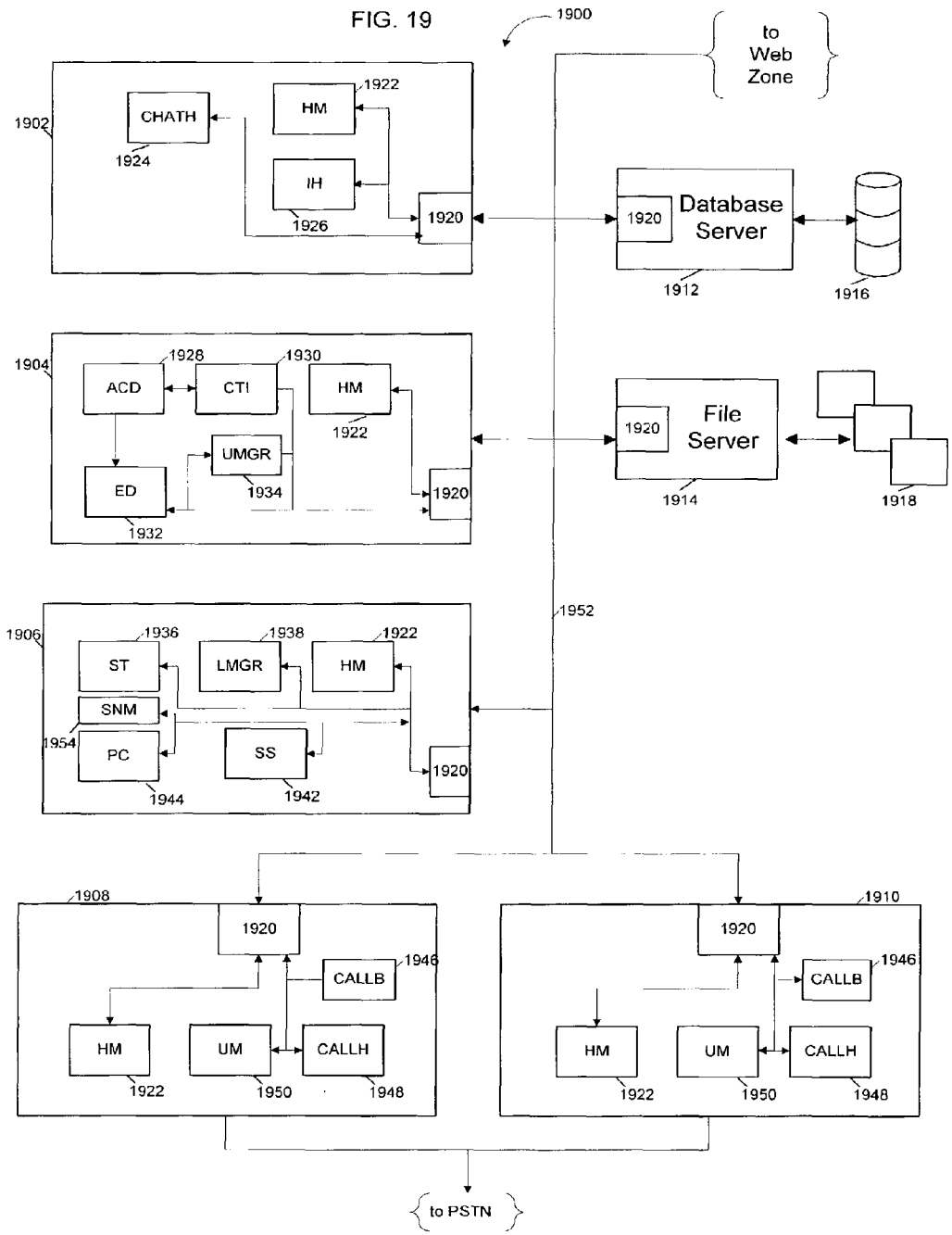
FIG. 19 is a diagram illustrating an example network zone configured in accordance with an embodiment of the invention and included in the distributed communication center of FIG. 8.

There are three application servers 1902, 1904, and 1906 and two telephony servers 1908 and 1910, in the example of FIG. 19, to illustrate that both hardware and software resources can be duplicated and/or divided between servers within network zone 1900. As explained above, one reason to duplicate or divide resources can be related to the hosting of multiple companies. Another reason, explained in detail below, is for resiliency. Other possible reasons can include simple resource management and system efficiency.

In practice, it can be preferred that software telephony resources run on telephony servers 1908 and 1910 and that software application resources run on application servers 1902, 1904, and 1906; however, due to the real-time, distributed nature of a communication center designed in accordance with systems and methods described herein, it is possible for the various hardware and software resources described herein to reside anywhere within a communication center, e.g., communication center 800. Thus, telephony resources can actually reside on application servers 1902, 1904, and 1906, while application resources can reside on telephony servers 1908 and 1910. Further, web zone resources can also reside on either type of server and network zone resources can reside in web zone servers. Accordingly, the zone segregation illustrated in FIGS. 2 and 8 are, in some respects, simply represents logical segregation as opposed to necessary physical world segregation.

Each host within network zone 1900 is shown comprising certain applications; however, this is just for purposes of illustration. Any of these resources can reside on any of he hosts within a network zone 1900 as required by a particular implementation. The first of these applications is a bus server application 1920. Bus server application 1920 can be the same or similar to bus server application 1812 described above. Thus, each host in network zone 1900 can have a bus server application 1920. In addition, each host in network zone 1900 can include a host manager application 1922 that can be configured to make all file transfers to/from application servers 1902, 1904, and 1906, telephony servers 1908 and 1910, file server 1914, and a corresponding web zone, for example, using FTP. Many conventional Operating Systems comprise native ability to perform such transfers. Therefore, some or all of host manager applications 1922 can comprise conventional operating system resources.

A host manager application can, for example, be generated by a network manager application. After creation, e.g., by the network manager application, a host manager application 1922 can be configure to create a directory structure on its corresponding host, and download all necessary system state library files 1918 (email/fax responses, IVR prompts, greetings) from a designated File server 1914. Further, if a user makes a change in the system state, for example by uploading a new file 1918 into a library stored in network zone 1900, a user state transmission application 820 can be configured to broadcast, e.g., over LAN 1952, the change to all hosts in network zone 1900. Each host can then download the change from file server 1914.

Additionally, every time communications take place between users, or between users and customers, the communication center can be configured to capture vital statistics, e.g., when and what type of communications—chat, email, telephone—occurred, as well as any associated files 1918, e.g., chat transcripts, conversation notes, etc. Such statistics and files can be transferred to file server 1914 to be stored in files 1918 under the control of a host manager application 1922.

Application server 1902 can also include an Internet handler application 1926 that can be configure to act as a communications link between real-time user application, e.g., interaction manger application 840, supervision manger application 838, or administration manger application 834, and other applications within network zone 1900. For example, Internet handler application 1926 can be configured to notify a Computer Telephony Integration (CTI) application 1930 that an agent pressed 'Mute' on his interaction manager GUI 400. An Internet handler application 1926 can also, for example, be configured to notify the agent's interaction manager application 840 that an Email Distributor application 1932 has forwarded an email to the agent. Further, Internet handler application 1926 can be configured to send chat communications from a Chat Handler (CHATH) application 1924 to and from customer terminals and agent terminals 830.

CHATH application 1924 can be configured to facilitate the communications between the agent terminals 830 and customer chat applets, through Internet handler application 1926. For example, when a customer requests a chat, CHATH application 1924 can be configured to find the best-suited agent by communicating with ACD 1928. CHATH application 1924 can then present the agent's terminal 830 with a new communication through Internet handler application 1926. Thereafter, again through Internet handler application 1926, CHATH application 1924 can be configured to effectively act as a reflector of customer-entered chat text to the agent's terminal 830, and vice versa.

CHATH application 1924 can, depending on the implementation, reside on a web server, e.g., web server 810, and not on application server 1902. The advantage to such a configuration is that communication delays associated with Internet handler application 1926 acting as a go between in chat communications can be avoided. In such a configuration, the customer can actually be connected to one web server, while the agent is connected with a different web server. Therefore, a different CHATH application 1924 can reside in each of the two web servers and can be configured to communicate with each other through a bus server application, e.g., bus server application 828.

It can be desirable for CHATH application 1924 to save vital chat statistics, e.g., when a chat occurred, who participated, what was discussed, etc., as well as a transcript of the customer-agent chat, in database 1916 or files 1918. It can also be desirable for such information to be stored as part of a larger global database that is unified for all media such that any communication center personnel can access the complete agent communication history for any customer using, for example, interaction manager application 840.

Computer Telephony Integration (CTI) application 1930 can reside on application server 1904 and can be configured to globally manage telephone connections for a hosted company by controlling system resources such as Call Handler (CALLH) application 1948 and Call Bridge (CALLB) application 1946. CTI application 1930 can be configured to keep track of all telephony resources and telephone lines, including which ones are available or in use, and by whom. CTI application 1930 can be configure to then use this information to make global decisions on how to connect new communications.

Figure 20:
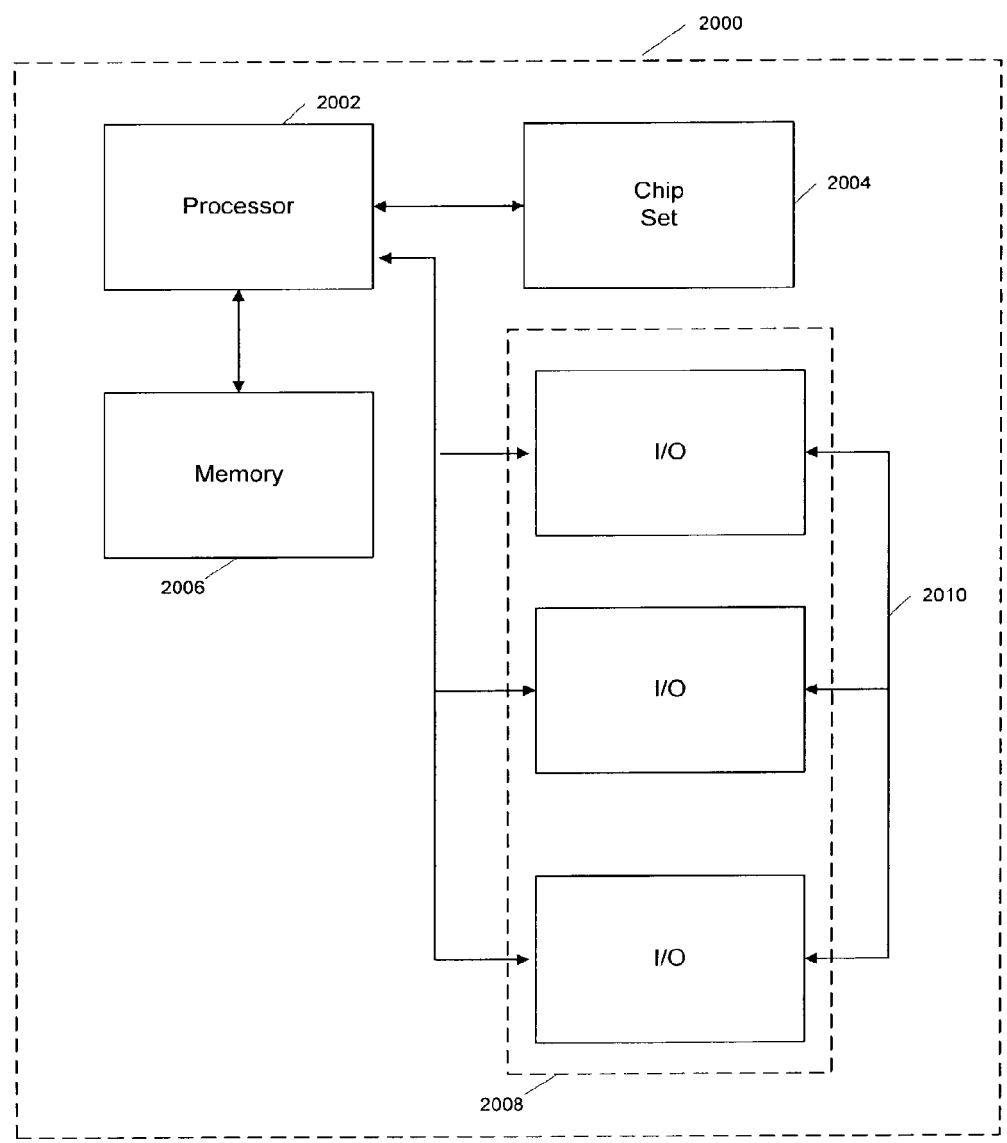
FIG. 20 is a logical block diagram illustrating example components that can comprise a telephony server included in the network zone of FIG. 19.

To aid in explanation, an example configuration for a telephony server 2000 will briefly be described in conjunction with FIG. 20. First, as with all the servers in a distributed communication center, such as communication center 800, a telephony server, e.g., telephony server 2008 or 2010, can be an off-the-shelf server with standard or custom hardware components, such as a processor 2002, a server chipset 2004, and memory 2006. In addition, it can comprise standard Input/Output (I/O) 2008 that can include expansion slots, e.g., IS, PCI, or CompaqPCI, into which custom or off-the-shelf telephony cards, e.g., Dialogic/Intel voice, fax, or conferencing boards, can be inserted. In one particular implementation, for example, telephony server 2000 comprises Intel's Dialogic hardware running on an off-the-shelf Compaq computer.

It should be noted that even though processor 2002 is illustrated as a single device in FIG. 20, it can actually comprise a plurality of processors and circuits. For example, processor 2002 can comprise one or more microprocessor and/or microcontroller circuits, a Digital Signal Processing (DSP) circuit, and other customized or customizable circuits depending on the implementation. These circuits can comprise a single Integrated Circuit (IC) or some or all of them can be standalone devices. Further, server chip set 2004, can comprise a plurality of circuits, depending on the implementation, that can be part of a single IC or one or more standalone devices. Some or all of processor 2002 can also be integrated with some or all of server ship set 2004 as well.

Memory 2006 can comprise a plurality of storage devices and media. For example, it can comprise memory circuits such as ROM or RAM ICs. Common examples are SRAM, EPROM, and FLASH circuits. These circuits can be included on a circuit board or can be removable devices, such as FLASH based memory cards. Memory 2006 can also comprise storage drives, such as hard drives, CDROM drives, etc. These drives can also be removable or can use removable digital media such as floppy disks, or CDs. All such storage devices and media can be termed, for purposes of this specification and the claims that follow, computer readable media.

The telephony cards can be connected to each other, for example, through a Computer Telephony (CT) bus 2010. The telephony cards can also be connected to various types of I/O lines, some of which can be: 1) Modular System Interface (MSI) local telephone extensions, 2) network connections to a LAN, 3) Asynchronous Transfer Mode (ATM) connections to a switch or another server, 4) telephone connections provided by a local telephone company's central office, e.g., T-1 or E-1 lines. T-1 lines are digital transmission links with a total signaling speed of 1.544 Mbps (1,544,000,000 bits per second). T-1 lines are the standard connectivity provided by telephone companies to businesses in North America.

Telephony cards can be configured to perform time division multiplexing (switching) such that simultaneous telephone conversations can take place on a shared physical line. For example, T-1 lines can typically carry 24 simultaneous full duplex conversations. Full duplex means that two people can have a simultaneous two-way conversation (they can talk and be heard at the same time on either end of the line). This capability of switching hardware may typically be measured in channels or time slots. For example, a T-1 line has 24 channels, one for each potential conversation, and 48 time slots, 1 time slot for communication in each direction. Moreover, a CT bus may have 1,024 time slots for inter telephony card communications. These channels or time slots may be numbered to refer to specific voice, data, video, or other communications.

CTI application 1930 can be configured to manage the aggregate channels and time slots of all the equipment dedicated to serve a company, or a number of companies hosted by a communication center. Different telephony cards can be assigned a range of time slots for communications across the CT bus. As communications occur, CTI application 1930 can be configure to keep track of what CT bus time slots are occupied, and what T-1, or other, channels may be used to control connection of a new calls from customers or communication center personnel.

For example, a call from a customer may come in over a T-1 line, and be presented to CTI application 1930 by a CALLH application 1948 managing the T-1 card on a particular CT bus time slot. CTI application 1930 can be configured to then ask a CALLH application 1948 managing a MSI card to call a particular call center agent at his particular extension. The MSI, under control of a CALLH application 1948, can then present CALLH application 1948 with the CT bus time slot for the communication. CTI application 1930 can be configured to then command the MSI card, through CALLH application 1948, to listen to the CT bus time slot of the T-1 call. CTI application 1930 can be configured to then command the T-1 card, through CALLH application 1948, to listen to the CT bus time slot of the MSI call, effectively bridging them.

It can be that the T-1 call comes into a telephony server other than the one the call center agent's telephone is connected to. In that event, a CALLB application 1946, which is described below, can become involved in handling the communication.

The selection of a particular agent to handle a particular customer communication can be the primary concern of ACD 1928. ACD 1928 can be configured to assign the best available agent to new, incoming communications. To do this, ACD 1928 can be configured to use information about the skills of agents, and the skill requirements of calls routed to specific workgroups, as well as agent status information provided through the agents interaction manger application 840. ACD 1928 should also be configured to use such information as company affiliation and language capability, which can for example be stored in database 1916, in call routing. Moreover, ACD 1928 can be configured to simultaneously accomplish the routing activity in real-time across all media types, e.g., telephone calls, emails, etc.

At any given time, an ACD 1928 can have: 1) a number of available agents waiting for a new communication, or 2) a number of communications queued waiting for the next available agent. In the first case, when ACD 1928 has more available agents than new communications, ACD 1928 can be configured to compute a score for all available agents, and pick the agent with the highest score to handle the next communication. The score may be derived using the method exemplified in the following tables 2-5. The method assumes that there are two workgroups, workgroup 1 and workgroup 2, two agents in each workgroup, agent 1 and agent 2 (for simplicity agent 1 and agent 2 are actually used for both workgroups 1 and 2), and two relevant skills, skill 1 and skill 2, to consider when routing an incoming communication.

Thus, Table 2 examines the relevant capabilities of the workgroups. Table 3 then examines the relevant capabilities of each agent, including how long they have been idle. Using table 4, an agent can be selected to receive the next communication routed to workgroup 1. Similarly, table 5 can be used to selected an agent to receive the next communication routed to workgroup 2. The workgroup, to receive an incoming communication, selected can be based on table 1, or other criteria or settings stored, for example, in database 1916.

TABLE 2

| WORKGROUP PROPERTIES | Workgroup 1 | Workgroup 2 | |
|---|---|---|---|
| Skill 1 Weight | 60 | 10 | How IMPORTANT is Skill 1 for the workgroup to be effective? |
| Skill 2 Weight | 30 | 70 | |
| TOTAL Skill Weight | 90 | 80 | Sum of skill weights |
| TOTAL Idle Time Weight | 10 | 20 | A measure of how often calls should be routed to more idle (less skilled) agents. By definition, the total skill weight and total idle time weight add up to 100 |

TABLE 3

| AGENT PROPERTIES | Agent 1 | Agent 2 | |
|---|---|---|---|
| Skill 1 Rating | 80 | 30 | How GOOD is the agent at Skill 1? |
| Skill 2 Rating | 20 | 90 | |
| Measured Idle Time (seconds) | 5000 | 7200 | How long has the agent been idle? |

TABLE 4

| AGENT IN WORKGROUP SCORING | | | Agent 1 | Agent 2 | Both Agent 1 and Agent 2 belong to Workgroup 1 and Workgroup 2 |
|---|---|---|---|---|---|
| Workgroup 1 | Skills | Score | 5,400.00 | 4,500.00 | How appreciable are the agent skills to the workgroup? Sum of agents kills multiplied by respective skill weight in workgroup |
| | | Normalized Score | 1.00 | 0.83 | Agent skills score divided by the largest agent skills score |
| | | Weighed Normalized Score | 90.00 | 75.00 | Agent normalized skills score times the Total Weight of Skills in the workgroup |
| | Time | Score | 50,000.00 | 72,000.00 | Agent Idle time times Idle Time Weight in the workgroup |
| | | Normal- | 0.69 | 1.00 | Agent Idle time |

TABLE 4-continued

| AGENT IN WORKGROUP SCORING | | Agent 1 | Agent 2 | Both Agent 1 and Agent 2 belong to Workgroup 1 and Workgroup 2 |
|---|---|---|---|---|
| | ized Score | | | score divided by the largest Agent idle time score |
| | Weighted Normalized Score | 6.94 | 10.00 | Agent's normalized idle time times the Total Idle Time Weight in the workgroup |
| | FINAL AGENT SCORE | 96.94 | 85.00 | Call to Workgroup 1 will be routed to Agent 1 |

TABLE 5

| AGENT IN WORKGROUP SCORING | | | Agent 1 | Agent 2 | Both Agent 1 and Agent 2 belong to Workgroup 1 and Workgroup 2 |
|---|---|---|---|---|---|
| Workgroup 2 | Skills | Score | 2,200.00 | 6,600.00 | |
| | | Normalized Score | 0.33 | 1.00 | |
| | | Weighed Normalized Score | 26.67 | 80.00 | |
| | Time | Score | 100,000.00 | 144,000.00 | |
| | | Normalized Score | 0.69 | 1.00 | |
| | | Weighed Normalized Score | 13.89 | 20.00 | |
| | FINAL AGENT SCORE | | 40.56 | 100.00 | Call to Workgroup 1 will be routed to Agent 2 |

If, on the other hand, ACD 1928 has more incoming communications than available agents, then an agent can be selected using the following criteria: 1) the communication is compatible with communications the agent is already handling, for example, an agent handling an email can be selected to receive an incoming communication, the theory being that the agent can handle the two simultaneously as opposed perhaps to two incoming calls; 2) a priority associated with an incoming communication, e.g., a lower priority communication currently being handled can be put on hold while a newer, higher priority communication is handled; 3) how long a communication has been queued; 4) an agents and/or workgroups relative score, e.g., based on a same or similar analysis to that of tables 2-5; and 5) The communication with the highest ID number.

ACD 1928 can be configured to determine which agents are available in a number of ways. For example, as mentioned, an agent can set his availability using his interaction manager application 840. This can be an important method given the race conditions that can occur in establishing an agent's availability in real-time. For example, when telephony server 1908 receives a customer telephone call, it can be configured to connect it to the best-suited agent. That agent, however, may attempt to make a separate telephone call after he has been selected, but before the call is actually routed to him, which would make him actually unavailable to handle the incoming telephone call. It can be desirable to configure telephony server 1908 to detect this situation, but this can be difficult given the intrinsic delays in communicating agent availability information across the communication center. Therefore, telephony server 1908, or ACD 1928, may not be able to make the best routing decision unless the agent's availability is computed centrally and as close to the agent as possible. Accordingly, it can in such situations be preferable that interaction manager application 840 determine an agent's availability as described above.

ACD 1928 can be configured, therefore, to route any type of communication, e.g., telephone, fax, email, web call-back, telephone call-back, web chat, etc., to the best-suited agent. For telephone communications, e.g., telephone calls, web callback requests, telephone callback requests, etc., the agent and customer can use their telephone, e.g., desk telephone, cellular telephone, soft telephone, etc., to communicate with each other. For offline communications, e.g., email, fax, or voicemail, where the client is not necessarily communicating in real-time with an agent, an Email Distributor application 1932 can be configured to manage the distribution of both inbound and outbound emails to/from the agent's terminal 830. The agent can then, for example, use a powerful off-the-shelf email client, such as Microsoft Outlook, to handle the communication and respond/communicate with the customer. For web chats, or similar web-initiated communications such as instant messaging and Short Message Service (SMS), a CHATH application 1924 can be configured to manage the real-time chat communications among agents and customers. Since chats occur in real time, it may be preferred that the agent's terminal 830 include a chat client application within, or separate from, interaction manager application 840. In certain embodiments, the customer can even be allowed to download a chat client from web server 810.

As described above, an Email Distributor application 1932 can be configured as the core of all communication center 800 email communications. Email Distributor application 1932 can be configured to retrieve customer emails from, for example, a POP3 mail server (see, e.g., mail server 218 in FIG. 2). For each incoming email, Email Distributor application 1932 can be configured to request an agent be selected by ACD 1928. Once an agent is selected, Email Distributor application 1932 can be configured to route an incoming email to the selected agent.

In certain implementations, all agent generated emails can first pass through a centralized storage area in network zone 1900. For example, by changing the "From" field in an agent generated email, the agent's reply can be sent to a common storage area. Although, agents can still be allowed to send personal emails directly to their POP3 email server without intervention by Email Distributor application 1932. Therefore, an agent's response may not, depending on the implementation, go directly from the agent to the customer so that the system can capture the agent's response and store it as part of the client history.

While Email Distributor application 1932 can be configured to handle the distribution of emails to communication center agents, a Unified Messenger (UMGR) application 1934 can be configure to be responsible for the distribution of faxes and voicemails, whether they were sent directly to an agent's extension or were routed by ACD 1928. Moreover, UMGR application 1934 can be used to make it possible for agents to retrieve their mail, e.g., voicemail, faxes, email, etc., through a telephone.

In the event of a failure in the distribution of emails, potentially with attached voicemail or faxes, the software applications effected, e.g., Email Distributor application 1932 or the UMGR application 1934, can be configured to log the failure event in database 1916. Then, a communication center administrator can, for example, use his administration manager application 834 to view information related to the failure, e.g., bad agent email address, bad address syntax, etc. The administrator can also be allowed to edit the information and re-send the failed communication using his administration manager 834.

Alternatively, UMGR application 1934 can be configured to resend the failed communication. This can be preferable, in fact because UMGR application 1934 has the ability to send emails and already has access to the file system 1918 where the failed communication is stored. Therefore, it can be desirable, depending on the implementation, to have a UMGR application 1934 in every host that either has telephony hardware or that has an Email Distributor application 1932 running thereon. Alternatively, UMGR application 1934 can be eliminated, and its functionality incorporated within another application such as Email Distributor application 1932, CALLH application 1948, or Host Manager application 1922. In fact, any of the application depicted in FIG. 19 can actually comprise part or all of another application depending on the particular implementation.

From the discussion above, it can be seen that a network manager application, e.g., network manager application 1808, can be configured to create a variety of software resources to handle the communications of one or many companies. Further, these different resources can be involved in a large number of communications. It may therefore be important to have a billing strategy and a method to limit these resources and/or communications.

Conventional communication centers often use products from a variety of companies that specialize in certain niches, e.g, fax solutions, email solutions, predictive solutions, etc. Systems integrators are then often employed to integrate these different products. Consequently, a company or communication center operator often must pay for a different license for each of the different products. In other words, there can be a different license for each different type of communication handled in communication center 800. This approach can, of course, be economically inefficient.

Seamless integration of resources that reduces the number of licenses needed and/or the burden of managing them can be achieved, however, using the systems and methods described herein. Such seamless integration can reduce economic inefficiencies, because communications can now be billed by the volume of communications as opposed to simply by type as with conventional approaches. Accordingly, the seamless integration afforded by the systems and methods described herein can allow a company the flexibility of bundling and unbundling solutions, e.g., fax, but not email, or fax and email, or just telephone, as is necessary. Further, it affords the ability to pay a vendor of a particular software application by the volume of overall communications, regardless of type.

The licenses acquired with the various software applications may still impose usage limits. A License Manager (LMGR) application 1938 can be used to enforce such limits. To enforce any usage limits, LMGR application 1938 can be notified when applications are started and stopped by a network manager application (not shown in FIG. 19). As a result, for example, if an application was added manually instead of by the network manager application, LMGR application 1938 can establish that the resource is not legitimate, and that it should be rejected. In such a situation, LMGR application 1938 can be configured to then notify the network manager applications of the rejected application. LMGR application 1938 can also be notified when communications are started and stopped by any network resource, so that it can effectively enforce usage limits.

Effective enforcement of licenses can also be aided using an authentication dongle that can be attached, e.g., at a serial port, within a communication center. A software vendor can, for example, encrypt system limitations in the dongle based on what a company or communication center operator has paid for. For example, a dongle can contain the peak number of licenses/communications that can be consumed by the whole communication center. In a hosted environment, the communication center operator can then, depending on the implementation, divide the allowable communications among the hosted companies. LMGR application 1938 can then be configured to enforce all limitations.

Another billing alternative that can be implemented in a communication center, configured according to the systems and methods described herein, is to allow a company to use as many communications or applications as it needs. LMGR application 1938 can be configured, in such cases, to periodically produce a encrypted and signed report that indicates how many communications, for example per hour, and how many application resources, for example peak usage, have been used. This can be particularly desirable for cases where peak hour consumption is not easily predicted, and interrupting service due to preconceived limitations may be undesirable.

LMGR application 1938 can also be configured to determine which application is a master and which is backup. This function is described in detail below in relation to the resiliency aspects of the system and methods described herein.

When an application is initiated by a network manager application, the newly initiated application can download a significant volume of configuration information from database 1916. Since the amount of data downloaded can be large, it can be preferable to configure the newly initiated application to connect directly to database 1916 upon startup for the application. After startup, the application may need to access database 1916, for example to store communication statistics or information. For these types of transactions, a Statistics Tracker 1936 can be configured to act as a gateway between the application and database 1916. Such an approach can minimize the number of simultaneous connections that database 1916 needs to maintain with communication center applications. Further, the centralization of database connectivity in a single application can prevent database failures from blocking activities that do not require database access.

A Simple Network Manager (SNM) application 1954 can be configured to make the communication center Simple Network Management Protocol (SNMP) compliant. Accordingly, SNM application 1952 can be an SNMP agent. SNM application 1952 can be configure to allow 3rd party applications to monitor communication center activity. For example, it may provide real-time statistics to a $3^{rd}$ party. SNM application 1952 can also be configured to notify 3rd party applications of any alarms, e.g., when a T-1 channel appears to be blocked. Finally, SNM application 1952 can be configured to allow a 3rd party application to take action on the communication center, for example, to correct a problem that caused an alarm to be issued.

System Scheduler application 1942 can be configured to keep track and act on scheduled events, e.g., scheduled changes in communication center functionality. Furthermore, System Scheduler application 1942 can be configured to intelligently predict when to generate such system changes so they take effect at the right time. For example, because a distributed communication center, e.g., communication center 800, can comprise zones or components anywhere in the world, such a scheduled activity may need to be performed in a time zone sensitive manner. Further, if a customer requested a web-callback for 3 pm PST, for example, and the estimated wait time for the next available agent seems to be around 30 minutes, the System Scheduler application 1942 should be configured to initiate the web-callback at 2:30 PM.

Other example scheduled activities can include modifying a telephone number for a given project, generating an ACD controlled web call back to a customer, or allowing an agent to schedule himself or his workgroup to call back a customer.

In addition to routing and handling incoming communications, a communication center configured in accordance with the systems and methods described herein can also be configured to handle outbound communications. For example, a communication center can be configured to schedule and generate telephone calls to a plurality of telephone numbers, e.g., to invite households to change their long distance carrier. A Predictive Caller application 1944 can be configured to handle such activity. As such, Predictive Caller application 1944 can be configured to generate a number of outbound telephone calls and connect them to available agents. Therefore, Predictive Caller application 1944 should be configured to balance the availability of customers on the telephone, e.g., based on how many telephone calls it makes, and the availability of communication center agents. Such balancing can help ensure that return on investment for such outbound telephone calls is optimized.

In some instances, more customers may answer the telephone in response to such outbound calls than expected. In which case, the communication center may not have enough available agents to handle all of the communications and, e.g., a call may need to be disconnected. Such disconnected telephone calls are often referred to as abandoned telephone calls. To assist in dealing with this situation a system administrator can configure aspects of Predictive Caller application 1944 through parameters input, for example, through an administration manger application 834. Some example parameters that can be configured are how many calls Predictive Caller application 1944 makes per number of available agents and a devised pacing algorithm to manage how many calls are made, and when. Further parameters-based configuration can allow an administrator to give feedback to such a pacing algorithm, for example, slowing down or accelerating the number of calls it generates.

Not all predictive calls seek to necessarily connect a customer to an agent. For example, doctor's offices may desire to play an appointment reminder to a patient. They may even desire to be able to leave a voicemail with that reminder in the patient's voicemail inbox. Predictive Caller application 1944 can be configured, for example through input parameters, to perform such functions as well. Predictive Caller application 1944 can also be configured to modify the list of contacts based on certain criteria. For example, if the telephone call generated by Predictive Caller application 1944 reaches a fax machine, then Predictive Caller application 1944 can be configured to remove the telephone number from the campaign's telephone number list, or possibly schedule a later call.

Each telephony server 1908 and 1910 can comprise one or more CALLH applications 1948, each configured to control one or more telephony cards/hardware, e.g., T-1 cards, MSI cards, etc. ATM cards/hardware, on the other hand, can be controlled by a dedicated CALLB application 1946. A CALLH application 1948 can be configured to monitor hardware queues for new events, e.g., incoming telephone calls, telephone picked up, etc., and control voice call and fax routing for any such events based on commands from a CTI application 1930. Depending on the implementation, one CTI application 1930 can be configured to control multiple CALLH applications 1948. Alternatively, one CALLH application 1948 can be controlled by multiple CTI applications 1930. To control its assigned hardware, a CALLH application 1948 can be configured to use an Application Programming Interface (API) provided by the hardware manufacturer. Such an API can provide the necessary resources, for example, to control calls, control conferencing, play tones, play voice message, and record voice. Therefore, such APIs not only define a set of instructions but also the responses/data that can be used with those instructions.

Thus, CALLH application 1948 can be made aware, among other things, of the telephony/routing information for a particular hosted company's projects/campaigns, telephone menus, workgroups, and agents so that CALLH application 1948 can effectively route telephony communications. For example, when a telephone call comes into a telephony server 1908, CALLH application 1948 can be configured to communicate to CTI application 1930 that the telephone call was received, on what host it was received, on what T-1 channel, and which CT Bus time slot is to be used for the telephone call. CALLH application 1948 can also be configured to transmit any voice associated with the telephone call. With the information received from CALLH application 1948, CTI application 1930 can be configured to command CALLH application 1948 to call a particular agent and connect the agent with the incoming telephone call. CALLH application 1948 can be configured to then make a telephone call to the agent's local/remote extension, which can result in a CT bus time slot being allocated for the agent to talk/transmit. CALLH application 1948 can be configured to then command the telephony server 1908 to allow the incoming telephone call to listen to the agent's time slot, and the agent's telephone call to listen to the incoming telephone call's time slot, effectively bridging the two.

In some instances, telephony server 1908 does not directly receive one half of the telephone call. In other words, one party's call is coming into telephony server 1908, while the other half is coming into another telephony server. Thus, the two halves of the telephone call must be bridged between the two servers. CALLB application 1946 can be configured for such situations to control ATM cards to bridge calls originating in one server and ending in another one. Telephony servers 1908 and 1910 can, therefore, comprise an ATM card, or some other type of high-speed telephony capable card, connected to an external ATM switch, or a similar type of switch such as a gigabit Ethernet switch. The ATM switch can be configured to transport data back and forth from any two cards in the system. For example, CALLB application 1946 in telephony server 1908 can be used by CTI application 1930 to facilitate a customer telephone call entering a T-1 card in telephony server 1908 that must exit a MSI card on telephony server 1910 to connect to an agent.

In a conventional system, ranges of time slots in the CT bus are allocated for ATM communications across any two servers. But this is not a scalable solution and, therefore, is not necessarily preferable. This is because it is preferable that an ATM solution provide high bandwidth connectivity, potentially using many time slots. As a result, statically allocating segments of the CT bus for cross-server ATM connectivity can quickly use all the time slots in a CT bus, even before a single telephone call is made. A communication center configured in accordance with the systems and methods described herein, however, can allow for dynamic allocation of a time slot for ATM connectivity from one server to any other server.

Figure 21:
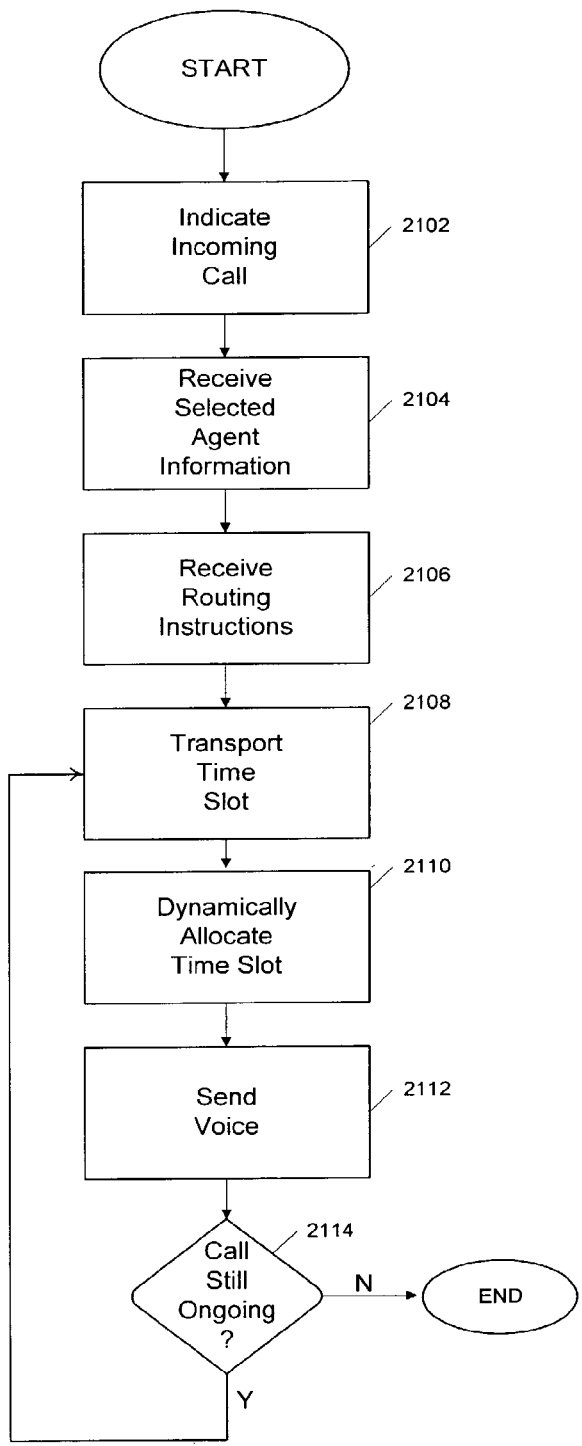
FIG. 21 is a flow chart illustrating an example method of bridging an incoming communication across a plurality of telephony servers like the telephony server of FIG. 20.

To achieve this dynamic allocation, a CALLB application 1946 can be configured to "transport" a transmit time slot for an incoming telephone call in one server, to another transmit slot, e.g., in the server where the agent's MSI card will be listening. The process can be explained in conjunction with the flow chart of FIG. 21 for an incoming call on a T-1 slot. First, in step 2102 the CALLH application 1948 associated with the T-1 telephone call in telephony server 1908 can be configured to indicate the incoming telephone call and the associated time slot to an ACD application 1928 on application server 1904. Then, in step 2104 ACD application 1928 can be configured to send CALLH application 1948 information regarding what agent to route the telephone call to.

Next, in step 2106, routing information can be provided, for example, CALLH application 1948 can be configured to send a request to a CTI application 1930 for instructions concerning routing the telephone call to the agent. Then, in step 2108, the time slot assigned the incoming telephone call on server 1908, can be transported to the server interfaced with the agent, e.g., telephony server 1910. CTI application 1930 can be configured to then, in step 2110, instruct CALLB application 1946 in telephony server 1910 to "transport" the assigned time slot into telephony server 1910. The transport can, for example, occur by communicating through the ATM switch in telephony server 1908 to telephony server 1910 instructing the latter to listen to the assigned time slot and transmit information received from the agent's terminal 830 over the assigned time slot.

Next, in step 2110, the ATM card in telephony server 1910 can be configured to dynamically allocate another time slot and use it to transmit what it receives from telephony server 1908 to the agent's terminal 830. In step 2112, telephony server 1910, e.g., the MSI card on telephony server 1910, can be configured to send the customer voice it receives to the agent's terminal 830 using the second assigned time slot.

In step 2114, it is determined if the telephone call is still ongoing. If it is, then the process can revert to step 2108. If it is not, then the process can end. A similar process is used to allow the customer to listen to the agent's voice. Therefore, using a process such as the one depicted in FIG. 21, a communication can be established across multiple servers, without a large negative impact on bandwidth.

The ability to transfer calls between servers, even if they are different types of servers or the transfer is from one type of card to another, can be beneficial in recovering when a server or switch in the system goes down. This is because, it can be possible to route communications through an alternative server or switch in the event to of a failure.

The ability to convert between one type of communication and another, e.g., between telephony and IP, can also prove beneficial in this regard. For example, if a plurality of remote agent's are handling telephony calls using telephony equipment, e.g., telephones, and there is a failure in the telephony equipment on the agent's side, then the communication center can simply convert the incoming telephony communications to IP based communications, e.g., VoIP, and continue to route the communications to the agents. The failure can, for example, comprise the failure of a local branch exchange, e.g., PBX, connecting the agents to a telephone company central office.

To aid in effectuating such a change over, i.e., from receiving telephony communications to VoIP, the agents often will need to reconfigure their terminals 830. This can occur in several ways. For example, an email can be sent to the agents' terminals 830 requesting that they configure for VoIP, which can for example be accomplished through an interaction manager application 840. Alternatively, an administrator can go in, e.g., through an administration manger application 834, and reconfigure the agents' terminals 830 for VoIP. Another possible approach is to administer the change on a hosted company basis, e.g., through settings associated with particular hosted companies.

Thus, the ability to reroute communications across servers and to convert communication types provides a communication center configured in accordance with the systems and methods described herein with a certain amount of resiliency. Resiliency refers to the ability of a system to adapt to changed conditions without any drop off in service. The capabilities described also provide a communication center with a certain amount of scalability, i.e., the ability to scale the size of a system up or down as required. Resiliency and scalability can also be provided using other methods. Some of these methods include software hot backup, web server hot boot, software and/or hardware redundancy, and default to the rest of the system.

Software hot backup comprises creating two or more instantiations of a particular software application and then configuring one to be the master and the others to be backups. The master and any backup applications both receive messages from other applications and generate responses; however, only the master application actually transmits its response. But if the master application experiences a failure to either the software or the associated hardware, then a backup application can step in and begins transmitting. Ideally, therefore, the master application and any backup applications reside on different servers, e.g., each on its own application server. Thus, if there is a hardware failure, it doesn't cause both the master application and any backup applications to fail.

Such an approach can be further enhanced using a bus architecture such as that described in relation to FIG. 18 and through the use of a LMGR application 1938. As was described above, an LMGR application 1938 can be configured to designate which applications are masters and which are backups. Thus, LMGR application 1938 can ensure that the assigned number of licenses are not exceeded even though backup instantiations of some or all of the applications are being generated.

Further, the associated host server for each application can comprise a bus server application 1812, which receives messages from applications on the same host and broadcasts them over, e.g. a LAN connecting the different hosts. Therefore, if an application generates a message for a master application on a different host, then that message will be broadcast over the LAN by the associated bus server application 1812. Both the master application for which the broadcast message was intended and a backup application can then retrieve the message off the LAN using their BUS server applications 1812. But only the master application can generate a response that is in turn broadcast over the bus. The backup application can generate a response, but until instructed by LMGR application 1938, it does not broadcast its response over the LAN.

LMGR application 1938 can be configured to detect a failure related to a master application in a number of ways. First, the bus server application 1812 associated with the failed master application can detect the failure and report it to LMGR application 1938. Alternatively, an application can detect the failure when it fails to receive a response from the master application and report, e.g., through its bus server application 1812, the failure to LMGR application 1938. In the event of a hardware failure that also effects the bus server application 1812 associated with the master application, other bus server applications 1812 can be configured to detect that the bus server application associated with master application is no longer registered or is not active in the network. This status can then be reported to LMGR 1812. Once LMGR 1812 is made aware of a failure related to the master application, it can instruct the backup application to take over.

In practice, however, there is often a delay between recognition that a failure has effected the master application and notification to the backup application to take over. During this delay, responses and/or new massages can be missed. Thus, even though the system may not crash immediately, the system state may be corrupted, which can ultimately cause the system to fail. Further, even though a failure has occurred, it can go undetected, meaning the backup application is never instructed to take over.

Thus, in a mission critical environment, e.g., where system failures have severe consequences, resource failure detection should be ensured, regardless of the cause or the situations surrounding it, no response messages should be lost during the transition from a master application to a backup application. A number of different methods can be used in a system configured in accordance with the systems and methods described herein to ensure that a resource failure is detected. For example, each application can be configured to periodically request a "still alive" confirmation from other applications in the system. A cost effective way to implement this is to have each application send a status confirmation to its associated bus server application 1812 upon receiving such a request. Alternatively, applications can automatically confirm their status with other applications. For example, each bus server application 1812 can be configured to automatically confirm its status and the status for any applications running on the same host to all other bus server applications 1812 in the system. Therefore, resource failure can be established dynamically, regardless of the cause of failure.

Once the failure is detected, steps should be undertaken to ensure that no messages are missed during the time it takes the backup application to begin transmitting responses. In order to ensure no messages are missed, applications can be configured to perform message identification and message rewind and real-play. For example, messages can be identified by combining a unique 32-bit application ID number, and a 32-bit message number. By doing so, a backup application can become aware of the last good message that a master application sent, and proceed with its responses from that point, and not any further. Thus, the backup application may need to rewind through its generated, but not sent, messages, until it gets to the last good message sent by the master application and start really playing, or sending, from that point on. This process can be called rewind and real-play.

The duplication of software applications so that there are backups in the system is one form of software redundancy. Others are discussed below. In addition, hardware redundancy can also be beneficial. One form of hardware redundancy has already been discussed, i.e., having multiple servers such as multiple application and/or telephony servers. Server redundancy can prove beneficial from a resiliency standpoint as well. Additionally, it can be beneficial for servers, or hosts, to have alternate routes of communication with other servers. Thus, for example, redundancy can be built into the LAN itself and bus server applications 1812 can be configured to exploit this redundancy in the event of a failure. In this regard, for example, a bus server application 1812 can maintain a message routing table with all the possible communication routes. If a failure is detected with one route, then an alternate route can be selected from the table and the table can be updated to remove the failed route or to indicate its failed status.

In certain situations, incoming messages or events can be queued and are not acted on immediately. Therefore, a backup application does not necessarily know what messages a corresponding master application is handling and when. To deal with this situation and ensure that the backup application is ready to step in should it be needed, the master application can be configured, upon extracting a message from the queue, to send information related to the extracted message to the backup application. This way, the backup application can keep apprised of the master application's activity and be prepared to step in if needed.

Another form of software redundancy that is similar to software hot boot, is to simply allow duplicate applications to operate in the system as long as their dual operation does not result in conflicting messages. For example, their can be more than one LMGR application 1938 operating at the same time. But each LMGR application 1938 should be implementing the same license limitations. Therefore, it would not cause a conflict if each LMGR application 1938 were simply allowed to operate and send messages related to license limitation oversight. If one LMGR application 1938 fails, then the others will continue to operate and the system will function correctly.

In fact, having multiple LMGR applications 1938 on multiple license servers at multiple sites running at the same time can actually be preferable form a disaster recovery point of view. This is because, even though we can have hardware redundancy and software redundancy, including software hot backup, what happens if the LMGR application 1938 is taken out? By having multiple license server, running in multiple places, correct usage limits can be ensured even if one of the license servers goes down. Thus, in one embodiment each LMGR application 1938, on each license server, can enforce usage limits for a portion of the system, e.g., based on geographic location. But each LMGR application 1938 can also be configured to scan all other LMGR application 1938 to determine global use limits as well as the use limits for each LMGR application 1938. If one of the LMGR application 1938 goes down, the others can take over. And because the LMGR application 1938 are located in different places, preferably for this purpose in different geographic locations, the likelihood that all LMGR application 1938 would go down a the same time can be minimized.

Software hot backup can, for example, be effective at ensuring network zone resiliency. Web server hot boot can be effective at ensuring web zone resiliency. Web server hot boot comprises applying hardware redundancy to the web servers included in a web zone. Thus, for example, more than one web server 810 can be included in web zone 804. If a first, primary web server fails, user sessions can be redirected to an alternate web server using a standard DNS server function. Network zone 802 applications, such as an Internet manager application, can be configured to load the alternate web server with all the information that it needs to operate effectively.

But it can be preferable, from a system security point of view, to establish the identity of communication personnel once they are interfaced with the alternative web server. The user session ID described above can, for example, be used for this purpose. Such a user session ID can, in certain implementations, be formed with a 32-bit web host ID number associated with the primary web server, and a 32 hit random number. When the user then tries to use this user session ID to authenticate himself to the alternative web server, the alternative web server can be configured to allow the user's session to persist until it can verify with an Internet Manager application whether that user session ID is valid. If the user session ID is invalid, then the user can, for example, be forwarded to a logout screen.

If, on the other hand, the user session ID is valid, then a similar approach to the software hot backup approach can be followed. For example, in web server hot boot, an Internet Manager application can send information to the new web server, i.e., hot boot the new web server, based on a calculated failure point for the first web server. In software hot backup, an application's failure point can be established using the methods described above. In web server hot boot, an Internet Manager application can establish a web server's failure time by identifying the last "action" it received from a user.

For its part, a user application can establish the web server's failure time by identifying the last time it received a ping/action response. Thus, both the Internet manager application and the user's application can be configured to rewind and re-play, which is not necessarily the same thing as real-play, the messages to the new web server. Additionally, the Internet manager application can be configured to send user state messages to the new web server to update the user's application with the latest system information. Therefore, despite a web server's failure, communication context can be preserved, communication loss can be prevented, and the user can be prevented from even being aware of the failure.

Because it can be ensured, using the methods just described, that a communication system can remain up and running indefinitely, i.e., failures detected and backups in place, it is possible to allow applications to be started, stopped, and configured using, e.g., a network manager application in real-time. In fact, after receiving a configuration message, an application can be configured to immediately start behaving differently based on the received configuration message. Accordingly, a system, such as a communication center 800 can avoid being shut down to implement, for example, a system up or downgrade. In other words, it can at least theoretically be possible to keep the system up and running perpetually. This can have significant consequences for mission critical systems that must be up and running at all times.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A system for providing a distributed call center configured to host a plurality of companies, comprising:
   a web server provided as part of a web zone, wherein the web server includes a manager application and is configured to receive and route incoming communications to a network zone;
   a plurality of nodes provided as part of the network zone, including an application server configured to receive the incoming communications from the web server, and route the incoming communications to a remote terminal that handles the incoming communications, wherein at least one of the plurality of nodes in the network zone comprises a plurality of applications and at least some of the plurality of applications are dedicated to certain different ones of said plurality of companies;
   a plurality of bus server applications, including
   a bus server application at the web server and
   at each of the plurality of nodes in the network zone an additional bus server application,
   wherein each of the bus server application at the web server and the additional bus server applications provides the manager application with real-time status information of applications at their respective nodes;
   wherein, in response to receiving the real-time status information, the manager application manages the applications in the network zone including stopping and modifying the applications as appropriate.

2. The system of claim 1, wherein the web server includes a user session manager configured to authenticate attempts to remotely access call center resources using the remote terminal.

3. The system of claim 2, wherein authenticating the remote access attempts comprises receiving a remote login message and initiating a user session in response to receiving the remote login message.

4. The system of claim 3, wherein authenticating the remote access attempts further comprises extracting login information from the received remote login message and storing the extracted login information.

5. The system of claim 4, wherein authenticating the remote access attempts further comprises tracking information related to the initiated user session.

6. The system of claim 3, wherein the user session manager is further configured to receive a logout message and end the initiated user session in response to the received logout message.

7. The system of claim 1, wherein the web server includes a real-time user state transmission application configured to relay status information related to the remote terminal to the network zone.

8. The system of claim 7, wherein relaying the status information comprises receiving an action request from the remote terminal and forwarding the action request to the network zone.

9. The system of claim 8, wherein the real-time user state transmission application is further configured to extract action request information from the received action request and store the extracted information in a queue.

10. The system of claim 9, wherein forwarding the action request comprises retrieving the action request information from the queue and forwarding it to the network zone.

11. The system of claim 1, wherein the web server includes a real-time user state reception application configured to relay status information related to the network zone to the remote terminal.

12. The system of claim 11, wherein relaying status information comprises receiving a message from the network zone generated in response to an action request from the remote terminal and transmitting the received message to the remote terminal.

13. The system of claim 11, wherein the real-time user state reception application is further configured to receive a query from the remote terminal and to transmit a received message to the remote terminal in response to the received query.

14. The system of claim 11, wherein the real-time user state reception application is further configured to:
   receive a query from the remote terminal;
   in response to the received query, determine if there are any messages to be transmitted to the remote terminal;
   if there are no messages to be transmitted, then wait for a configurable period to receive any messages from the network zone to be transmitted to the remote terminal; and
   transmit any received messages when they are received.

15. The system of claim 1, wherein the web server includes non-real-time system state transmission/reception application configured to relay status for non-real-time communications between the remote terminal and the network zone.

16. The system of claim 1, wherein the web server includes a database interface application configured to interface the remote terminal with a database.

17. The system of claim 1, wherein the web server includes a FTP interface application configured to interface the remote terminal with a file server.

18. The system of claim 1, wherein the web server includes a remote database/file handler application configured to handle database and file requests from the remote terminal.

19. A method for providing a distributed call center configured to host a plurality of companies, comprising:
   providing a web server as part of a web zone, wherein the web server includes a manager application and is configured to receive and route incoming communications to a network zone;
   providing a plurality of nodes as part of the network zone, including an application server configured to receive the incoming communications from the web server, and route the incoming communications to a remote terminal that handles the incoming communications, wherein at least one of the plurality of nodes in the network zone comprises a plurality of applications and at least some of the plurality of applications are dedicated to certain different ones of said plurality of companies;
   providing a plurality of bus server applications, including
      a bus server application at the web server and
      at each of the plurality of nodes in the network zone an additional bus server application,
      wherein each of the bus server application at the web server and the additional bus server applications provides the manager application with real-time status information of applications at their respective nodes;
   wherein, in response to receiving the real-time status information, the manager application manages the applications in the network zone including stopping and modifying the applications as appropriate.

* * * * *

UNITED STATES PATENT AND TRADEMARK OFFICE
CERTIFICATE OF CORRECTION

PATENT NO.      : 8,549,107 B2
APPLICATION NO. : 13/102970
DATED           : October 1, 2013
INVENTOR(S)     : Ezerzer et al.

It is certified that error appears in the above-identified patent and that said Letters Patent is hereby corrected as shown below:

In the Drawings:

On sheet 16 of 21, in figure 16, line 3, Delete "TErminal" and insert -- Terminal --, therefor.

In the Specification:

In column 2, line 55, delete "Embodiemnts" and insert -- Embodiments --, therefor.

In column 7, line 22, delete "handled" and insert -- handle --, therefor.

In column 7, line 53, delete "protocol" and insert -- protocol. --, therefor.

In column 9, line 17, delete "interne" and insert -- internet --, therefor.

In column 9, line 33, delete "an" and insert -- can --, therefor.

In column 14, line 37, delete "comrnunications," and insert -- communications, --, therefor.

In column 14, line 40, delete "fnain ta n" and insert -- maintain --, therefor.

In column 14, line 54, delete "cookies," and insert -- cookies. --, therefor.

In column 20, line 28, delete "an the" and insert -- the --, therefor.

In column 26, line 3, delete "thousand" and insert -- thousands --, therefor.

In column 26, line 53, delete "he" and insert -- the --, therefor.

In column 40, line 15, delete "their" and insert -- there --, therefor.

In column 40, line 44, delete "a" and insert -- at --, therefor.

Signed and Sealed this
Eighteenth Day of February, 2014

Michelle K. Lee
*Deputy Director of the United States Patent and Trademark Office*